United States Patent
Jackson et al.

(10) Patent No.: US 9,428,205 B2
(45) Date of Patent: Aug. 30, 2016

(54) SECURITY CART

(71) Applicant: Cannon Equipment LLC, Cannon Falls, MN (US)

(72) Inventors: Keith Edward Jackson, Minneapolis, MN (US); Paul Larie, Londonderry, NH (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 14/622,352

(22) Filed: Feb. 13, 2015

(65) Prior Publication Data

US 2016/0082996 A1 Mar. 24, 2016

Related U.S. Application Data

(60) Provisional application No. 62/052,590, filed on Sep. 19, 2014.

(51) Int. Cl.
| | |
|---|---|
| *B62B 3/02* | (2006.01) |
| *B62B 3/14* | (2006.01) |
| *B62B 1/20* | (2006.01) |
| *B62B 3/18* | (2006.01) |
| *B62B 3/00* | (2006.01) |

(52) U.S. Cl.
CPC .............. *B62B 3/025* (2013.01); *B62B 1/208* (2013.01); *B62B 3/004* (2013.01); *B62B 3/1476* (2013.01); *B62B 3/186* (2013.01)

(58) Field of Classification Search
CPC ....... B62B 1/208; B62B 3/004; B62B 3/025; B62B 3/186; B62B 3/1476; B62B 3/02; B62B 3/04; B62B 3/14; B62B 3/18; B62B 5/0433; B62B 5/0485; B62B 2205/20; B62B 2205/33
See application file for complete search history.

(56) References Cited

U.S. PATENT DOCUMENTS

| | | | |
|---|---|---|---|
| 2,992,010 A * | 7/1961 | Sides | .................... B62B 3/1476 |
| | | | 280/33.997 |
| 3,191,959 A | 6/1965 | Heimbruch | |
| 3,197,224 A | 7/1965 | Kappen | |
| 3,272,528 A | 9/1966 | Young et al. | |
| 3,519,286 A | 7/1970 | Andersen | |
| 3,628,805 A | 12/1971 | Archer | |
| 3,840,242 A | 10/1974 | Craig, Sr. et al. | |
| 3,840,243 A * | 10/1974 | Rheinhart | ............... B62B 3/002 |
| | | | 280/33.996 |
| 3,861,768 A * | 1/1975 | Wilson | ................... B62B 3/186 |
| | | | 280/33.995 |
| 3,971,568 A | 7/1976 | Wright | |
| 3,977,689 A | 8/1976 | Rosa | |
| 3,981,510 A | 9/1976 | Gustafsson | |
| 4,065,141 A | 12/1977 | Wilson | |
| 4,097,097 A | 6/1978 | Hosko | |
| 4,169,416 A * | 10/1979 | Haynes | ..................... A47F 5/00 |
| | | | 108/166 |

(Continued)

*Primary Examiner* — Frank Vanaman
(74) *Attorney, Agent, or Firm* — Andrus Intellectual Property Law, LLP

(57) ABSTRACT

A security cart includes a rear wall, a wheeled base frame connected to the rear wall and a base shelf pivotable between a horizontal position and a raised position. A first sidewall and a first door pivotally connected to the first sidewall are movable from locked positions with the base shelf to a folded position forwardly of the rear wall. A second sidewall and a second door pivotally connected to the second sidewall are movable from locked positions to a folded position forwardly of the folded first sidewall and first door. The base shelf is movable from the horizontal position to the raised position, and retained against the folded first sidewall and the first door and the folded second sidewall and second door.

26 Claims, 18 Drawing Sheets

(56) References Cited

U.S. PATENT DOCUMENTS

| | | |
|---|---|---|
| 4,263,749 A | 4/1981 | McDougle |
| 4,346,906 A | 8/1982 | Thorpe |
| 4,456,273 A | 6/1984 | McKinnon |
| 4,509,805 A * | 4/1985 | Welsch ............ A47F 5/135 312/210 |
| 4,542,806 A | 9/1985 | Olson |
| 4,678,090 A | 7/1987 | Ross |
| 4,895,382 A | 1/1990 | Andersson |
| 5,137,403 A * | 8/1992 | McCaffrey ............ B62B 3/04 410/104 |
| 5,263,701 A | 11/1993 | Kleinhen |
| 5,480,187 A * | 1/1996 | Binning ............ B62B 3/025 280/79.2 |
| 5,524,917 A | 6/1996 | Iverson et al. |
| 5,765,702 A | 6/1998 | Bustos et al. |
| 5,873,204 A | 2/1999 | Gehn et al. |
| 6,331,009 B1 | 12/2001 | Wilkinson |
| 6,786,494 B2 | 9/2004 | Garbiso |
| 6,974,042 B2 | 12/2005 | Hall |
| 6,986,527 B2 | 1/2006 | Carver |
| 7,185,899 B2 | 3/2007 | Thiede et al. |
| 7,213,816 B2 | 5/2007 | Gregory et al. |
| 7,320,472 B2 | 1/2008 | Gregory et al. |
| 7,419,063 B1 | 9/2008 | Hall |
| 8,528,918 B2 | 9/2013 | Macias |
| 8,567,795 B2 | 10/2013 | Megens |
| 2011/0031259 A1 | 2/2011 | Megens |
| 2011/0204760 A1* | 8/2011 | Finstad, III ............ A47B 57/06 312/311 |
| 2013/0001904 A1 | 1/2013 | Macias |

* cited by examiner

SECURITY CART

CROSS-REFERENCE TO RELATED APPLICATION

The present utility application relates to and claims priority to U.S. Provisional Patent Application No. 62/052,590, filed Sep. 19, 2014, which is herein incorporated in entirety.

FIELD

The present disclosure relates to security carts and more particularly to security carts that are collapsible, nestable and utilized to secure and transport a wide variety of goods.

BACKGROUND

The following U.S. patents are incorporated herein by reference in entirety.

U.S. Pat. No. 3,191,959 discloses a hand cart having a generally rectangular main frame, a pair of side structures hingedly connected to parallel side portions of the frame for independent swinging movement relative to the frame, and a bottom structure hingedly connected to a horizontal lower portion of the frame for independent swinging movement. The side and bottom structures together with the frames serve to define a vertically extending carrying space that is open at its front, when the side and bottom structures extend in planes at right angles to the general plane of the frame, and wheel means mounted on the lower end of the cart, and means for detachably securing the lower edges of the side structures to the bottom structure. The securing means is detached by swinging the side structures in directions away from the bottom structure and about the axes of the pivotal connections between the side structures and the main frame. The side and bottom structures when the security means is disengaged are collapsible upon each other adjacent the front side of the frame.

U.S. Pat. No. 3,840,242 discloses a nestable transport rack having frame means which is composed of a nestable wheel supported base frame and a pair of horizontally spaced, upstanding and parallel side frame members rigidly secured to the base frame and extending upwardly therefrom. Shelf means are pivotally secured to the frame means and are pivotable between a generally horizontal position and a vertical position, the vertical position being parallel with the upstanding side frame members. Sidewall means are provided which are pivotally secured to each of the side frame members and are pivotable between a first position on opposite lateral sides of the shelf means when the shelf means are in the horizontal position, and a second position parallel to the shelf means when the shelf means is in the horizontal position. At least a portion of the nestable, wheel-supported base frame extends frontwardly of the upstanding side frame members and the shelf means when the shelf means is in the vertical position and the sidewall means is in the second position parallel to the shelf means and is capable of nesting with another of the transport racks.

U.S. Pat. No. 4,346,906 discloses a roll pallet comprising a frame, an end wall and a deck. Also, there may be two sidewalls pivotally connected to the end wall. The deck can be pivoted into a raised position in which it is parallel to the end wall, and the sidewalls can be folded inwardly. The pallet can then be nested, for storage, with another similar pallet, by virtue of the shape of the frame, which comprises two converging limbs. The frame is provided with wheels and the deck is provided with stabilizing wheels which resist toppling of the pallet when it is carrying a load.

U.S. Pat. No. 5,873,204 discloses a wheeled cart having a base and three sidewalls extending therearound and upward therefrom. A pair of partial doors is hingedly secured to and extends along edges of two opposing sidewalls for permitting partial coverage of a fourth side of the cart. Each partial door includes a spring-biased manually operable pin for cooperating with a plurality of slots in the cart base. The base front edge also has an inwardly angled portion along the length thereof that angles up to a horizontal shoulder. The horizontal shoulder includes the first pair of the plurality of pin retaining slots. A vertical portion then rises from the level of the shoulder to the level of the main area of the cart base. In this mode, the end of the pin rides up on the angled portion when the door is closed with sufficient force, thereby overcoming the biasing force of the spring. The pins of each door will then insert into the first slots in the shoulder area. The vertical edge prevents any further movement of the doors inward as the pins thereof are blocked thereby.

SUMMARY

Through research and experimentation, the present inventors have determined that a need exists to design and construct a mobile cart that provides enhancements in support of doors and sidewalls relative to a base shelf and a base frame, collapsibility and latching of the doors, sidewalls and the base shelf, braking of caster wheels on the base frame, and an e-track strapping arrangement for securing the cart or objects placed within the cart.

In one example, the present disclosure relates to a security cart including a rear wall having a pair of side extensions projecting forwardly therefrom and a bottom supporting member extending forwardly from the rear wall in support of the side extensions. A base frame has a pair of diverging limbs interconnected at front ends thereof by a front crosspiece. The limbs have front ends provided with a set of front wheels, and rear ends provided with a pair of rear wheels supported beneath the bottom supporting member of the rear wall. A base shelf is supported in a horizontal load bearing position upon the base frame when the can is in transport and loading conditions, and is pivotally mounted about a rear edge to the bottom supporting member of the rear wall for movement to a raised position. A first sidewall is pivotally connected to one of the side extensions of the rear wall and to the bottom supporting member. The first sidewall is pivoted between a first position locked and supported on one of the side edges of the base shelf and a second position folded parallel to the rear wall. A first door is pivotally attached to the first sidewall. The first door is pivoted between a first position locked over a front edge of the base shelf, and a second position unlocked from the base shelf and folded with the first sidewall parallel to the rear wall. A second sidewall is pivotally connected to the other of the side extensions of the rear wall and to the bottom supporting member. The second sidewall is pivoted between a first position locked and supported on another side edge of the base shelf, and a second position folded parallel to the rear wall and forwardly of the first door in its second position. A second door is pivotally attached to the second sidewall. The second door is pivoted between a first position locked over the front edge of the base shelf, and a second position unlocked from the base shelf and folded with the second sidewall parallel to the rear wall and forwardly of the first sidewall in its second position. The base shelf is pivoted from the horizontal position to the raised position for retaining the first sidewall, the first door, the second sidewall and the second door in their second positions when the cart is in the collapsed position.

In another example, the security cart has a second wall provided with a retaining latch arrangement for holding the base shelf in the raised position. With the base shelf in the raised position, the retaining latch arrangement is movable about a vertical axis from a first position lying against the second sidewall to a second position swung away from the second sidewall and to a third position engaged with the base shelf. The retaining latch arrangement includes a spring biased to hold the retaining latch arrangement in the first and third positions. Latching rod arrangements are provided on the first sidewall, the first door, the second sidewall and the second door, and are engagable and disengagable with retaining brackets on the base shelf.

In a further example, the first sidewall is provided with a first latching rod arrangement having a first latching rod. The second sidewall is provided with a second latching rod arrangement provided with a second latching rod. The base shelf has opposed side edges, each being provided with a side retaining bracket configured with a locking aperture, a ramped portion leading to the aperture and a stop tab. Each latching rod is engagable and disengagable with the ramped portion and locking aperture, and each stop tab prevents each of the first and second sidewalls from swinging outwardly from the base shelf.

BRIEF DESCRIPTION

DETAILED DESCRIPTION

Figure 1:
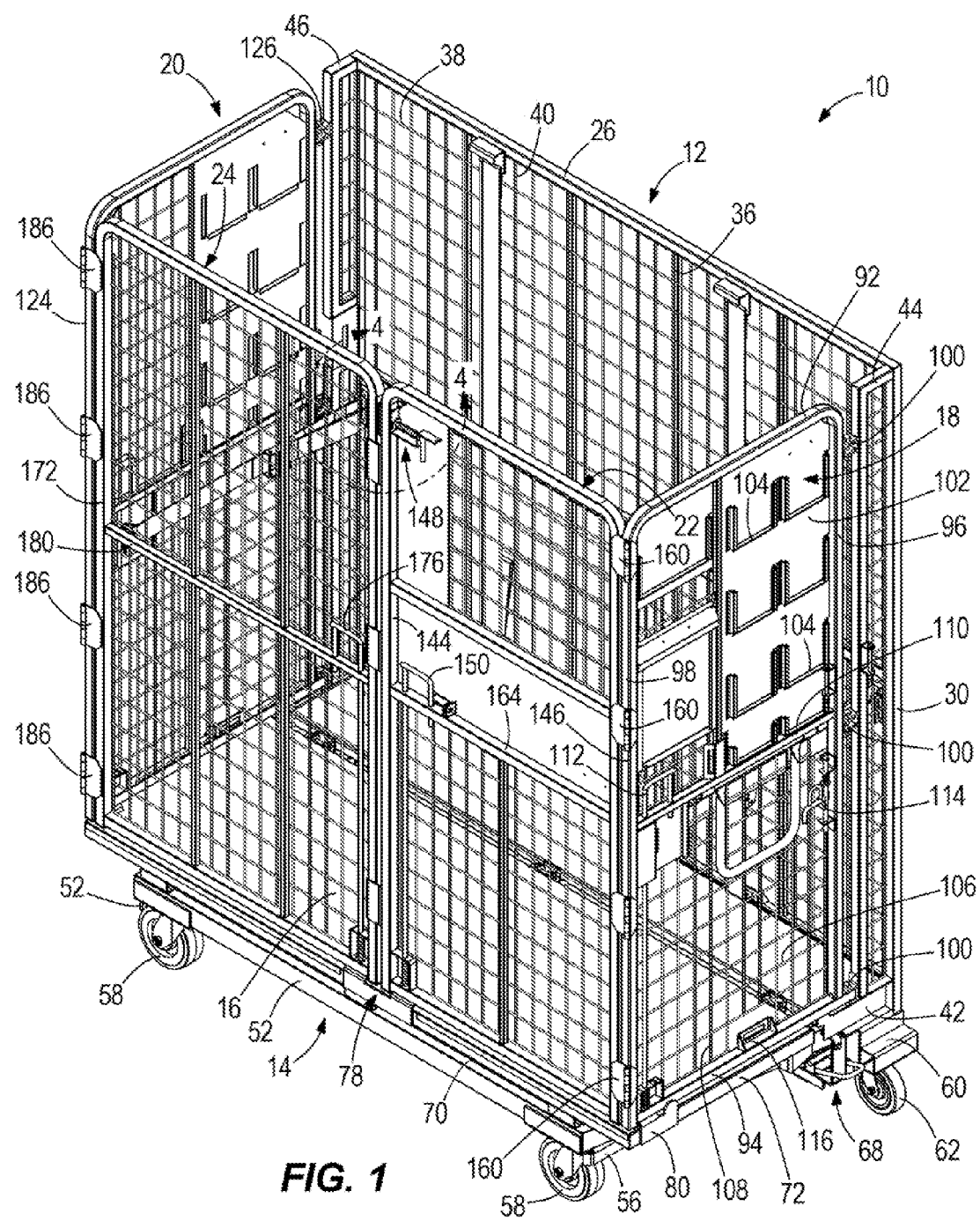
FIG. 1 is a front perspective view of a mobile security cart in accordance with the present disclosure.

The mobile security cart 10 of the present disclosure is illustrated in various FIGS. 1-26, and is generally comprised of a rear wall 12, a wheel supported base frame 14, a base shelf 16, a pair of opposed sidewalls 18, 20 and a pair of opposed doors 22, 24.

Figure 2:
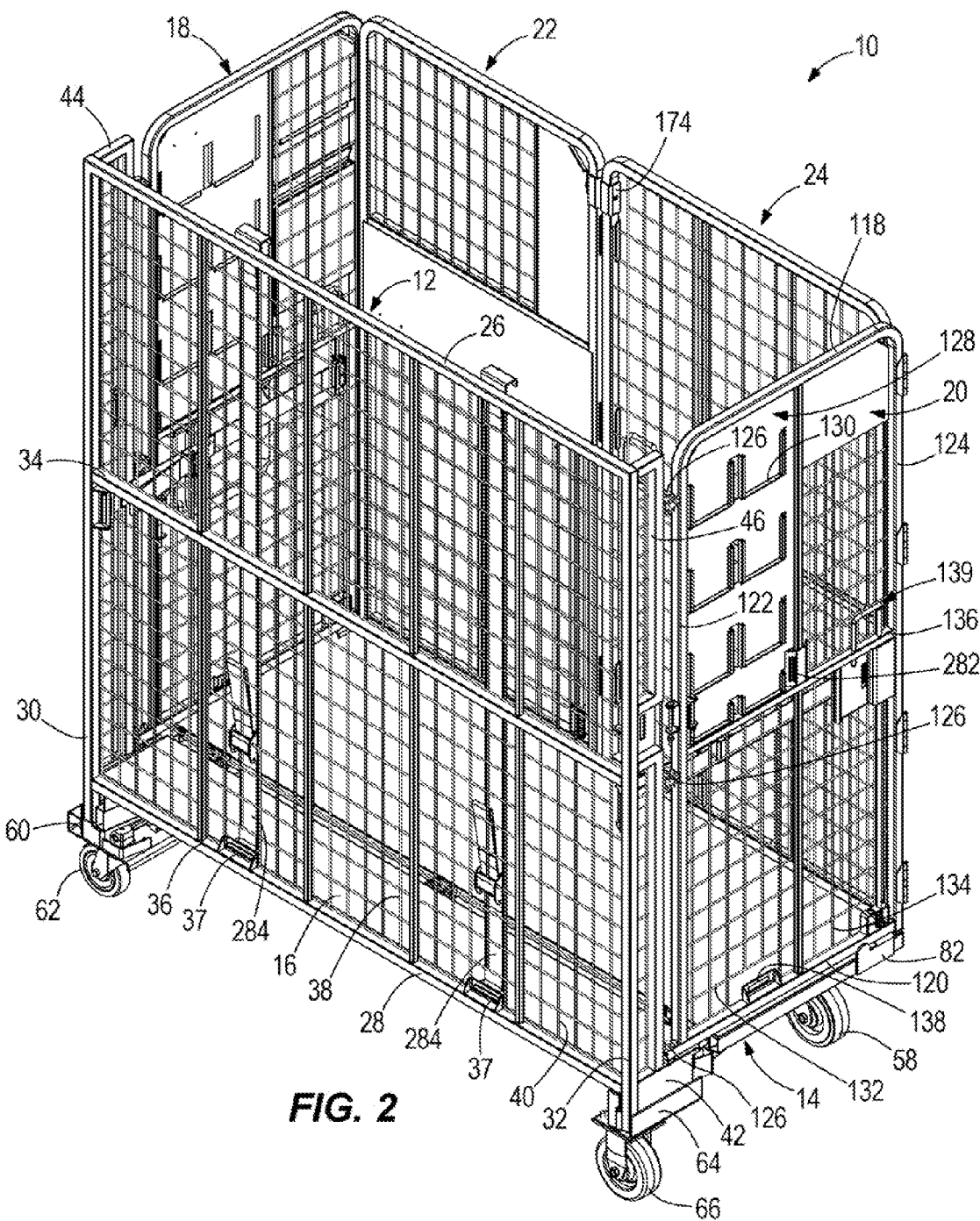
FIG. 2 is a rear perspective view of the security cart.
Figure 3:
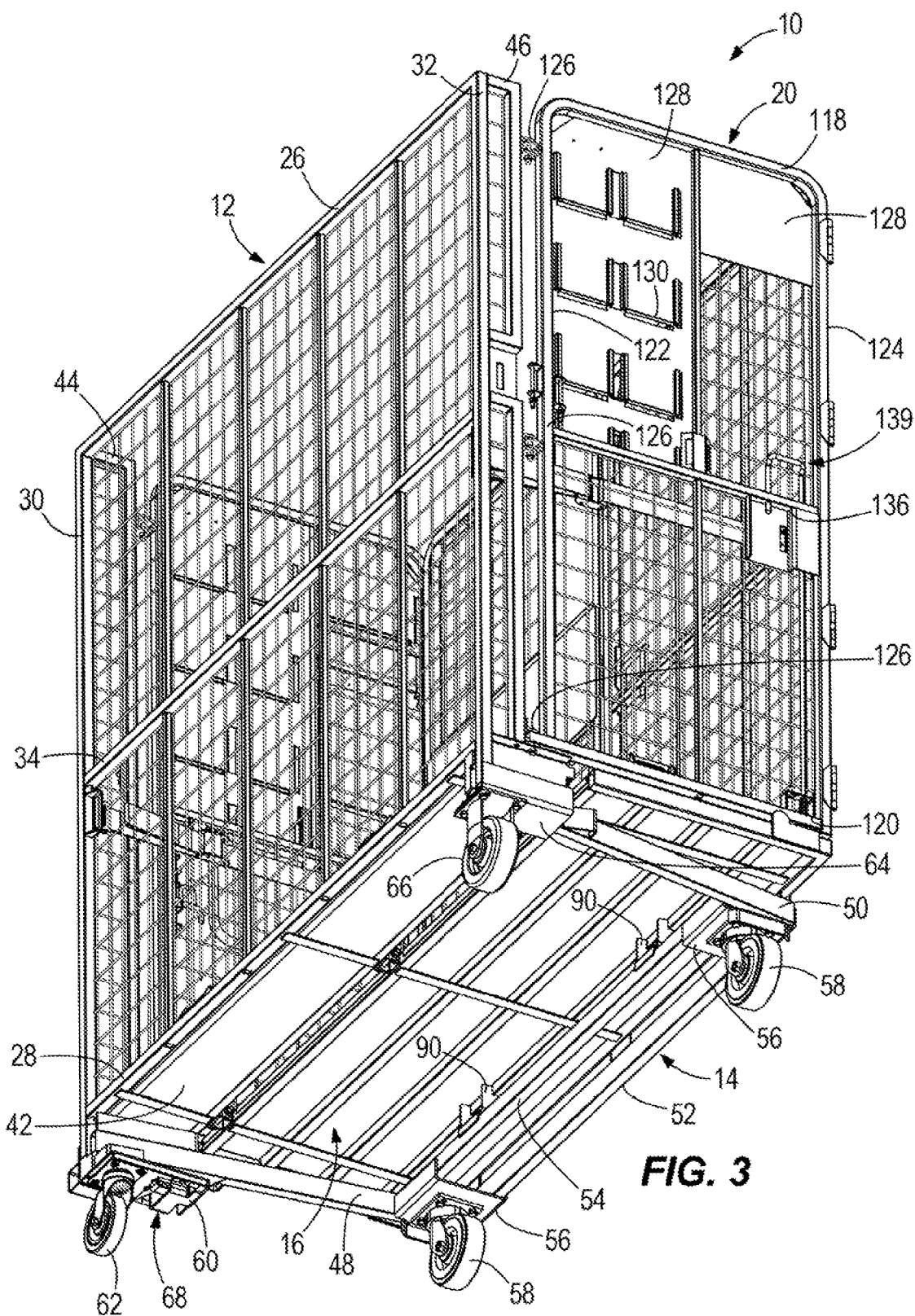
FIG. 3 is a bottom perspective view of the security cart shown in FIG. 2.
Figure 15:
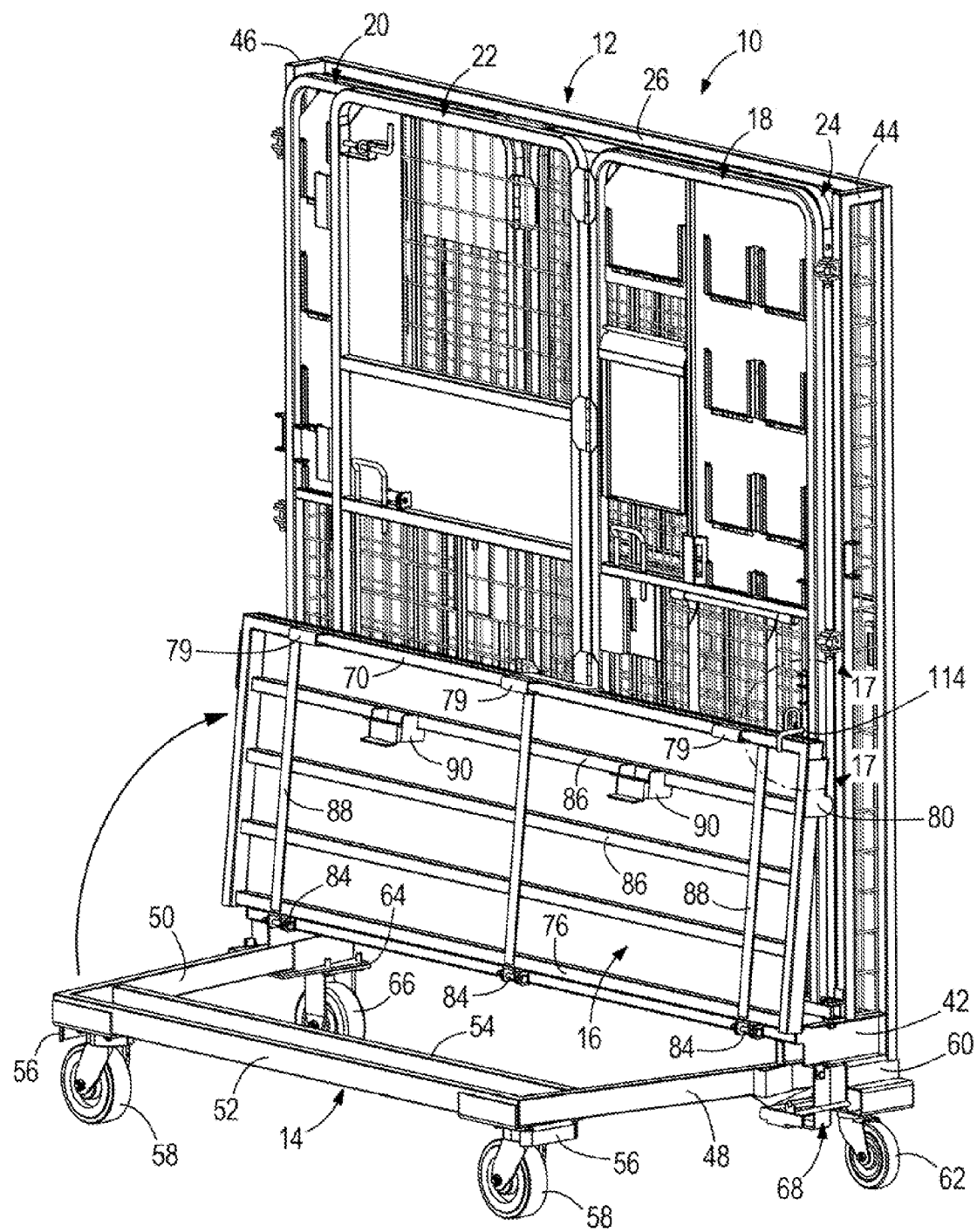
FIG. 15 is a front perspective view of the security cart in a fully folded collapsed position showing a base shelf folded in an upright raised position and retained against the folded sidewall and doors shown in FIG. 14.

As seen FIGS. 1-3, the cart 10 in a preferred transport condition defines an open top four-sided conveyance which is used to secure and carry a variety of items. As will be seen in other figures, the cart 10 is variously configurable for loading, and, when desired, can be fully folded into a collapsed, nestable condition, such as shown in FIG. 15.

Referring to FIGS. 2, 3, 15 and 18, the rear wall 12 has upper and lower horizontally extending members 26, 28, respectively, opposing vertically extending side members 30, 32, respectively, an intermediate horizontally extending reinforcement member 34, and a number vertically extending reinforcing members 36. Lower member 28 is provided with a pair of mounting brackets 37 which can be used to retain e-track straps inside the rear wall 12 as will be further explained hereafter. The rear wall 12 also has a series of intersecting horizontally and vertically extending wire members 38, 40, respectively, extending between the upper and lower members 26, 28 and the side members 30, 32. A bottom shelf-like supporting member 42 extends forwardly from the lower member 28. A pair of fixed side extensions 44, 46, respectively, project forwardly from the side members 30, 32. Together, the rear wall 12 and the side extensions 44, 46 define a U-shaped stub frame.

The base frame 14 has a generally V-shaped construction having a pair of laterally diverging limbs 48, 50 and an interconnecting front crosspiece 52. A reinforcing crosspiece 54 is located behind crosspiece 52 and also interconnects the limbs 48, 50. Bottom front corners of the base frame 14 are provided with attachment devices 56 for mounting a pair of front wheel casters 58 thereto. A rear end of limb 48 is joined to a mounting structure 60 provided with a rear wheel swivel caster 62. A rear end of limb 50 is secured to a mounting structure 64 equipped with another rear wheel caster 66. The mounting structures 60, 64 underlie and are connected to opposed ends of the supporting member 42 of the rear wall 12. As will be described hereafter, the mounting structure 60 is configured with an actuable braking mechanism 68 (FIG. 1) for permitting and preventing rotation and rolling travel of the wheel caster 62 so as to selectively enable and disable transit of cart 10.

Figure 13:
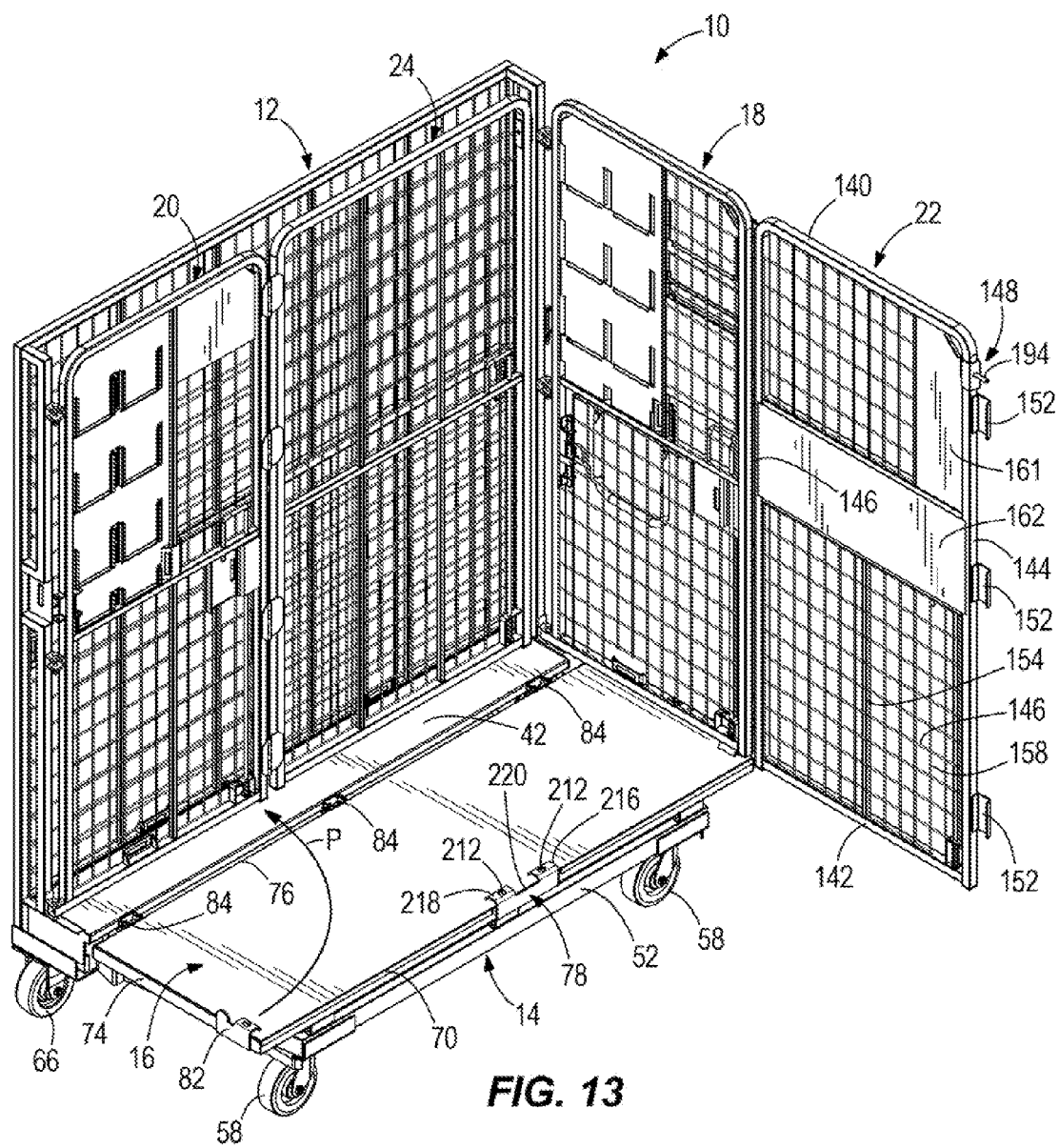
FIG. 13 is a front perspective view of the security cart showing the left sidewall and the left front door folded inwardly.
Figure 14:
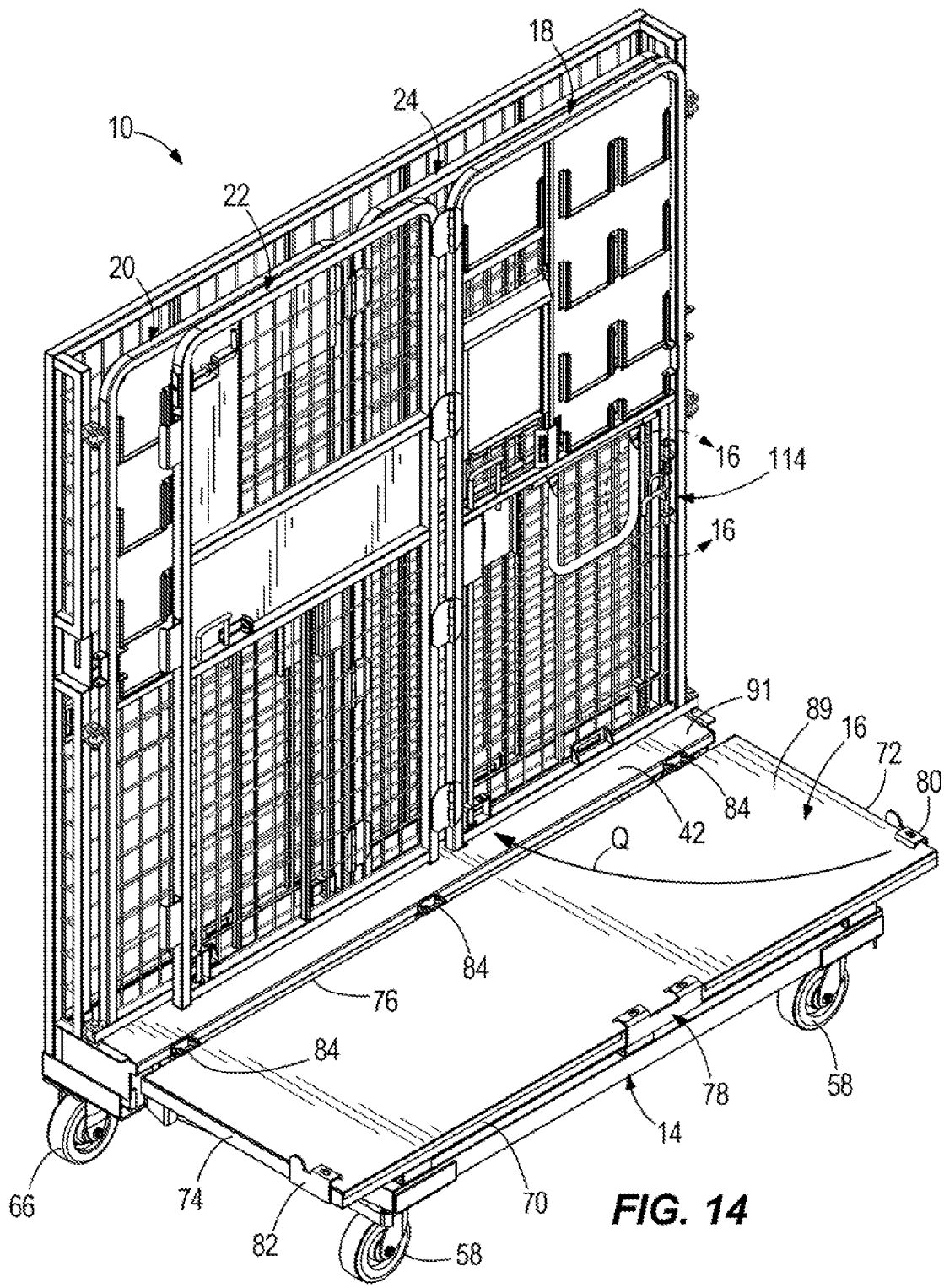
FIG. 14 is a front perspective view of the security cart showing a right sidewall and a right door folded inwardly over the left sidewall and left front door as shown in FIG. 13.

As best seen in FIGS. 3 and 14, the base shelf 16 is configured for support and retention upon the base frame 14. The base shelf 16 has a generally rectangular shape including a front edge 70, opposing side edges 72, 74 and a rear edge 76. The front edge 70 includes a front retaining bracket 78 for maintaining the doors 22, 24 in a locked position as shown in FIG. 1. As best seen in FIG. 15, the bottom of front edge 70 has a number of U-shaped spacers 79 depending therefrom which are engagable with the upper end of base frame crosspiece 52. The side edges 72, 74 are provided with respective side retaining brackets 80, 82 for holding the sidewalls 18, 20 in a locked position. The rear edge 76 is pivotally connected to the front end of the support member 42 of the rear wall 12 by a series of spaced apart hinges 84 so that the base shelf 16 can be moved about a horizontal pivot axis between a horizontal load bearing support position (e.g. FIGS. 1 and 13) and a raised nestable position (FIG. 15). In the latter figure, it can be seen that a number of retaining member 86 extend across the length and a number of retaining members 88 extend across the width of base shelf 16 on a bottom surface thereof. One of the members 86 carries a pair of retaining clips 90 which are frictionally engaged with the reinforcing crosspiece 54 on the base frame 14 as shown in FIG. 3, so that the base shelf 16 is normally retained upon the base frame 14 in the horizontal position for supporting items to be transported in the cart 10. In the horizontal position of FIG. 14, an upper surface 89 of the shelf base 16 is slightly below an upper surface 91 of the supporting member 42.

Referring now to FIG. 1, the sidewall 18 includes upper and lower horizontally extending members 92, 94, respectively, a vertical rear member 96, and a vertical front member 98. The rear member 96 is pivotally connected to the extension 44 of rear wall 12 by three vertically spaced apart pivot connections 100 so that the sidewall 18 may pivot relative to extension 44. The sidewall 18 is provided with solid panels 102 which are configured with pockets 104 for holding various information related to cart contents or destination. The sidewall 18 also includes a number of intersecting horizontally and vertically extending wire members 106, 108, respectively, extending between the members 92, 94, 96, 98 and a horizontally extending intermediate reinforcing member 110. A front portion of the sidewall 18 is provided with a first spring-biased latching arrangement 112 for enabling the sidewall 18 to be held in and released from a locked position relative to the base shelf 16. A rear portion of sidewall 18 includes a spring-biased shelf base retaining latch arrangement 114 which can be utilized to hold the base shelf 16 in the raised position shown in FIG. 15. The lower member 94 is formed with a mounting bracket 116 for a purpose similar to mounting brackets 37 on rear wall 12.

As seen in FIGS. 2 and 3, the sidewall 20 includes upper and lower horizontally extending members 118, 120, respectively, a vertical rear member 122 and a vertical front member 124. The rear member 122 is pivotally connected to the extension 46 of rear wall 12 by three vertically spaced apart pivot connections 126 so that the sidewall 20 may pivot relative to extension 46. The sidewall 20 is provided with solid panels 128, one of which is provided with pockets 130 similar to pockets 104 on sidewall 18. The sidewall 20 also includes a set of intersecting horizontally and vertically extending wire members 132, 134, respectively, and a horizontally intermediate reinforcing member 136. The lower member 120 includes a mounting bracket 138 used for a similar purpose as mounting bracket 116 with an e-track strap. A front portion of the sidewall 20 is provided with a second spring-biased latching rod arrangement 139 for enabling the sidewall 20 to be held in and released from a locked position relative to base shelf 16.

Figure 9:
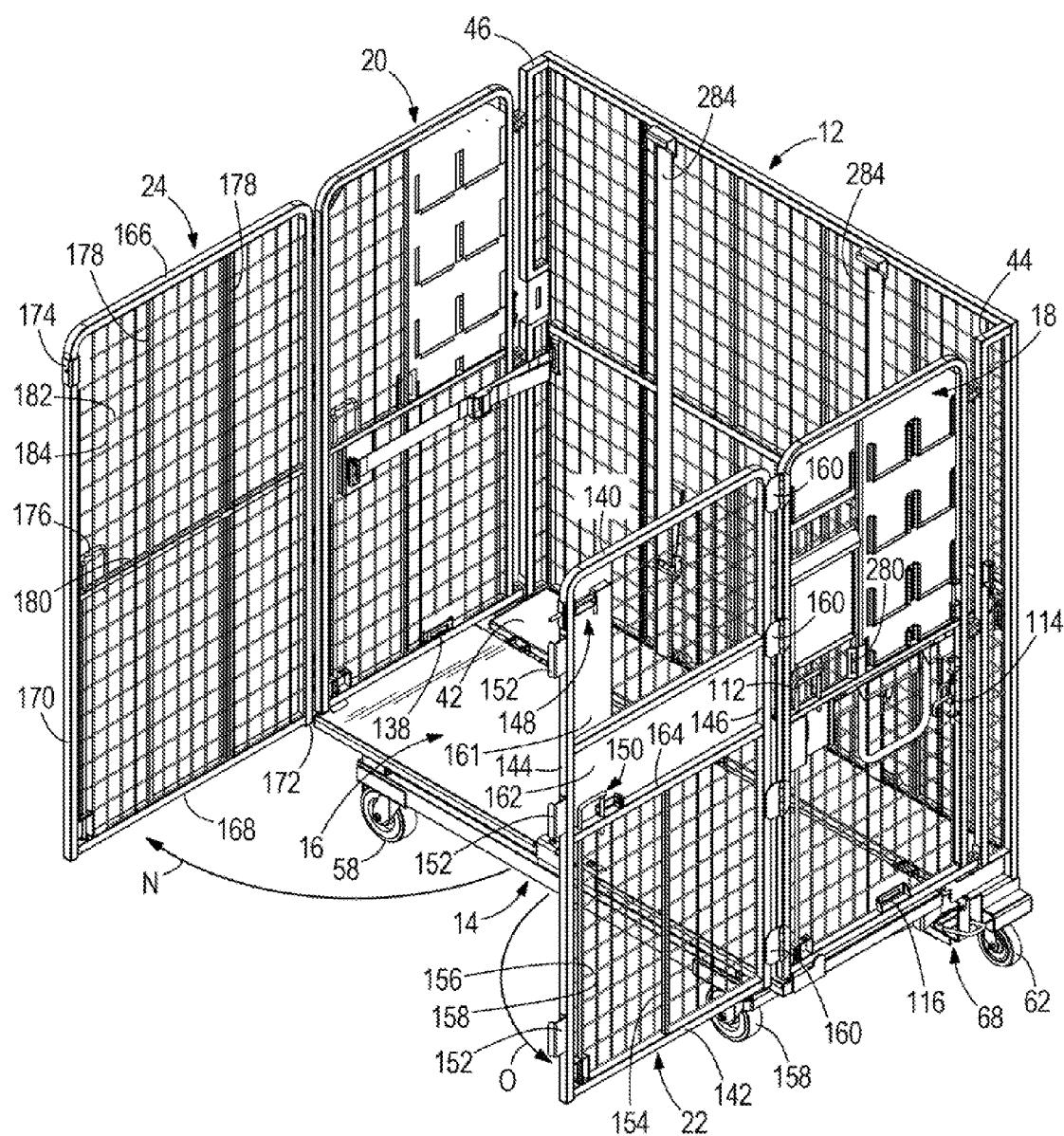
FIG. 9 is front perspective view of the security cart with its doors unlocked and opened and showing an e-track strapping arrangement provided on the security cart.

Referring to FIGS. 1, 9 and 13, the door 22 includes upper and lower horizontally extending members 140, 142, respectively, a vertical inner member 144 and a vertical outer member 146. The inner member 144 includes an upper door latching pin arrangement 148 and a third spring-biased latching rod arrangement 150 for enabling the door 22 to be held in and released from a locked position relative to the base shelf 16. The inner member 144 also includes a set of vertically spaced retaining brackets 152 which are engagable with the opposing door 24. The door 22 is further provided with a vertical reinforcing number 154 and intersecting horizontally and vertically extending wire members 156, 158, respectively. The outer member 146 is pivotally connected to front member 198 on sidewall 18 by a set of four vertically spaced apart pivot hinges 160 so that the door 20 can pivot about a vertical pivot axis relative to sidewall 18. The door 20 has a vertically extending solid panel 161 and a horizontally extending solid panel 162 with a lower member 164 on which a portion of the third latching rod arrangement 150 is mounted.

As seen in FIGS. 1 and 9, door 24 includes upper and lower horizontally extending members 166, 168, a vertical inner member 170 and a vertical outer member 172. The inner member 170 has a receiving portion 174 for the latching pin arrangement 148 on opposing door 22, and a fourth spring-biased latching rod arrangement 176 for enabling the door 24 to be held in and released from a locked position relative to the base shelf 16. The door 24 further includes vertical reinforcing members 178, a horizontal reinforcing member 180 and a set of intersecting horizontally and vertically extending wire members 182, 184, respectively. The outer member 172 is pivotally connected to front member 124 on sidewall 20 by a set of four vertically spaced pivot hinges 186 (FIG. 1) so that the door 24 can pivot about a vertical pivot axis relative to sidewall 20. As best seen in FIG. 9, the door 24 has a width which is greater than the width of door 22.

Figure 4:
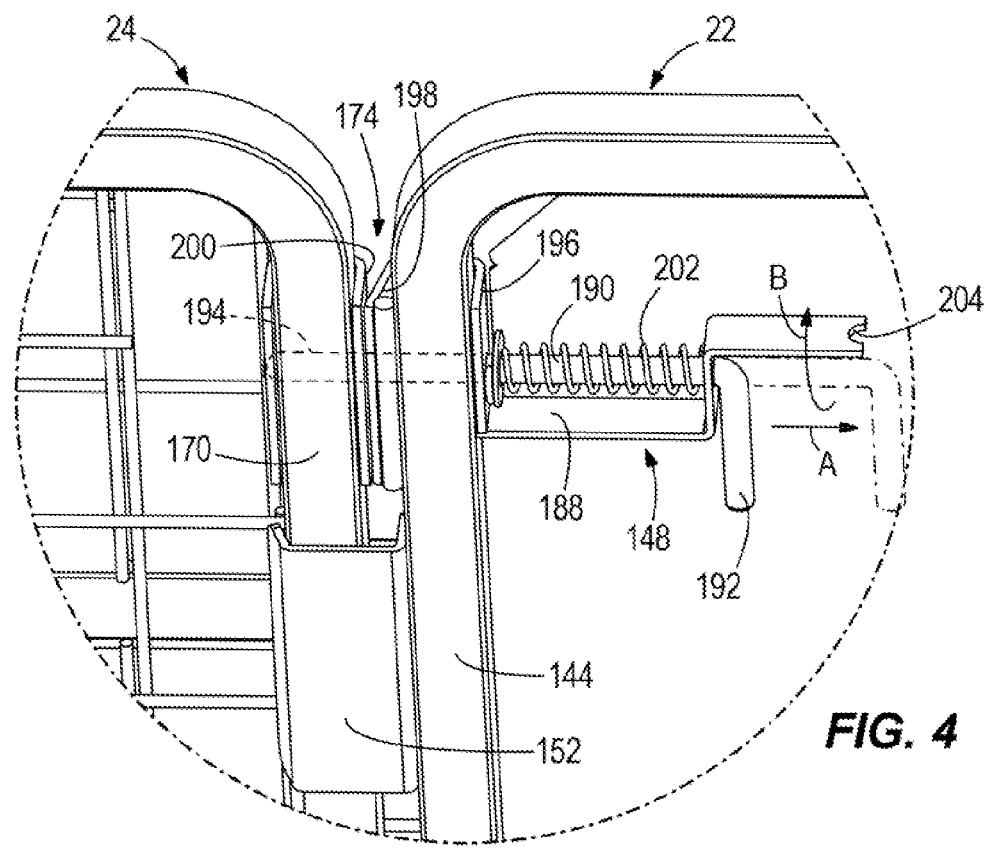
FIG. 4 is an enlarged detail view of an upper door latching pin arrangement of the security cart taken on line 4-4 of FIG. 1, and shown in an extended locking condition.
Figure 5:
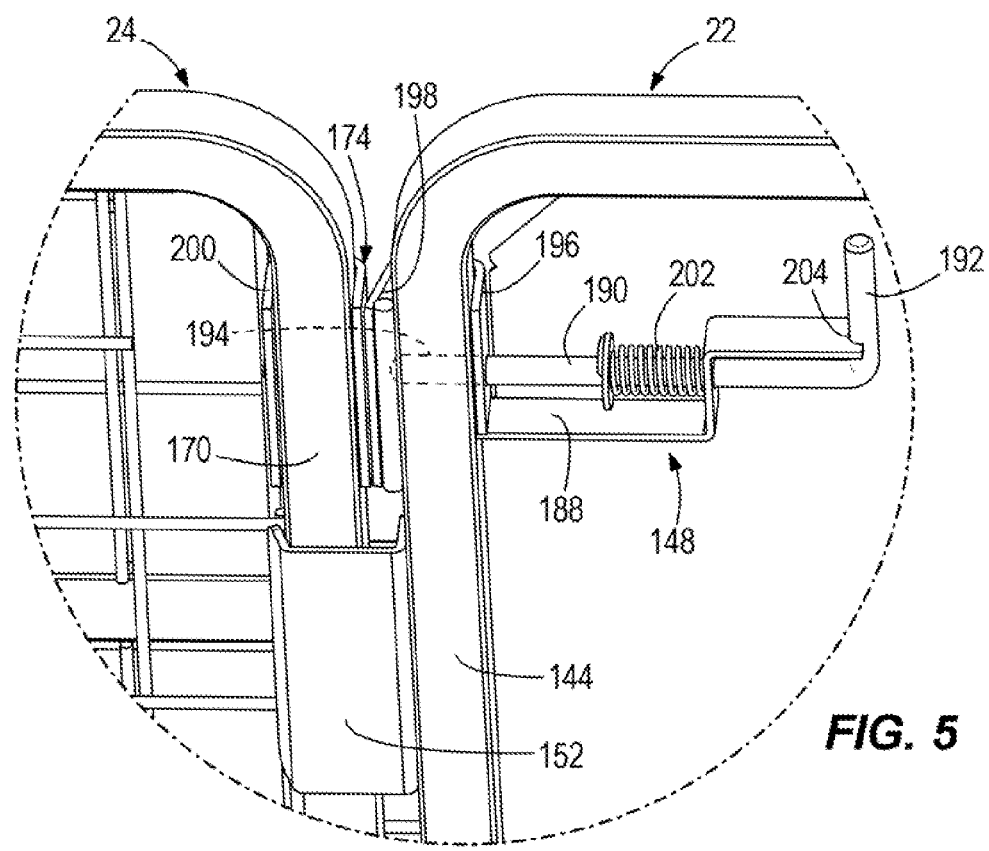
FIG. 5 is a view similar to FIG. 4 showing the upper door latching pin arrangement in a retracted unlocked condition.

Referring now to FIGS. 4 and 5, the upper door latching pin arrangement 148 on door 22 cooperates with the receiving portion 174 on door 24 to control locking and unlocking and support of the doors 22, 24 at the upper ends thereof. The latching pin arrangement 148 includes a mounting bracket 188 for receiving and retaining a movable hardened L-shaped latching pin 190 having a bent handle 192 and a pin end 194. The mounting bracket 188 includes a U-shaped bracket 196 which partially surrounds the door inner member 144. The bracket 196 includes an angled portion 198 engagable with a U-shaped bracket 200 of receiving portion 174 that wraps around the portion of door inner member 170. The angled bracket 196 and the bracket 200 are designed to push both doors 22, 24 apart at the top to counteract sagging that occurs due to the weight of the doors 22, 24, and to avoid misalignment thereof.

In use, the latching pin 190 is slidably mounted relative to the doors 22, 24 and includes a surrounding spring 202 mounted for biasing the pin end 194 through aligned holes in the inner members 144, 170 and the brackets 196, 200 so that the upper ends of the doors 22, 24 are in locked position as shown in FIG. 4. When it is desired to unlock the upper ends of the doors 22, 24, the handle 192 is pulled in the direction of arrow A against the bias of spring 202 to the phantom line position of FIG. 4. The handle 192 is then rotated in the direction of arrow B, and engaged in a recess 204 on an end of mounting bracket 188 as seen in FIG. 5, so that the pin end 194 is retracted from the aligned holes in door inner member 170 and the bracket 200.

Figure 6:
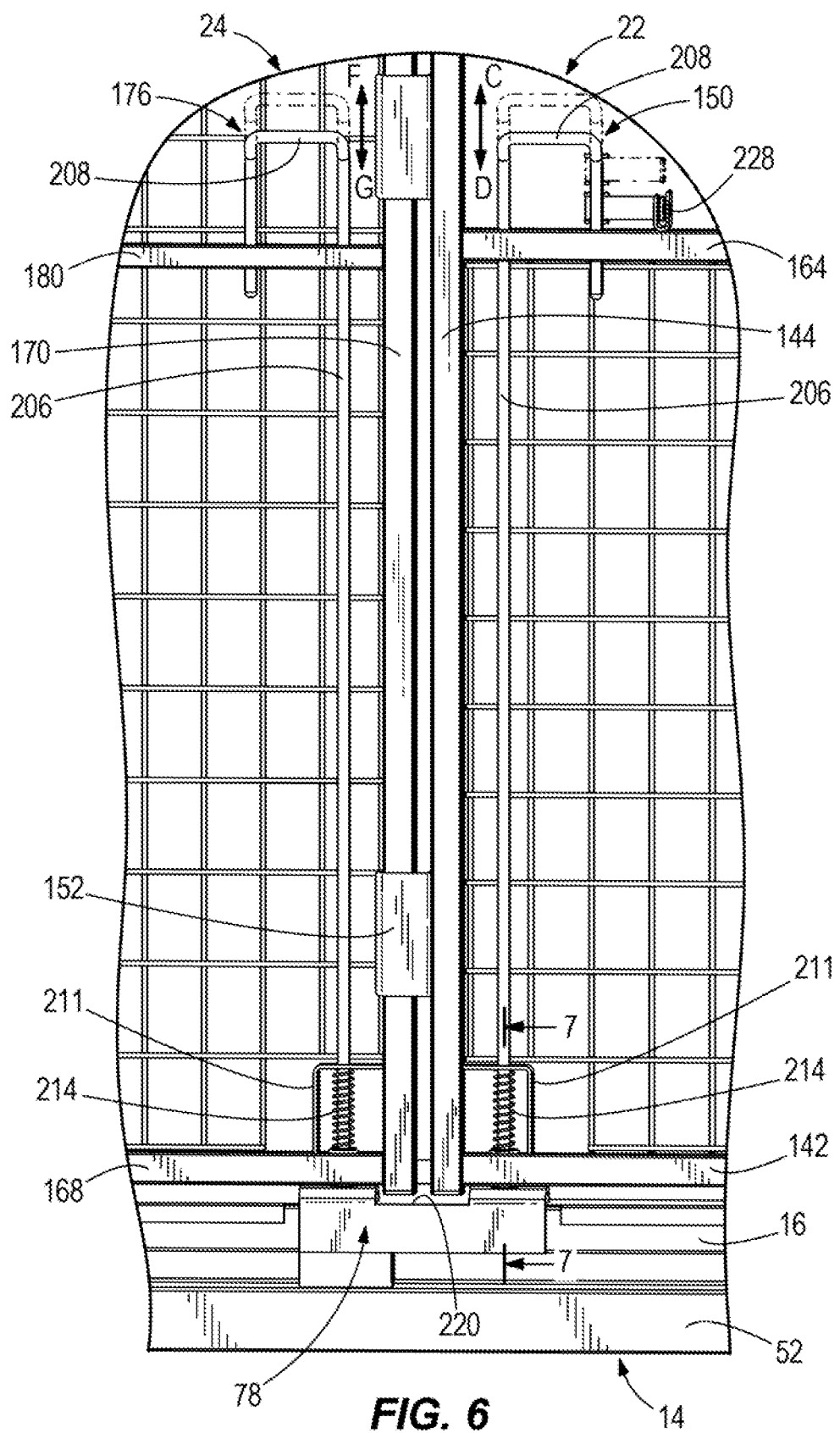
FIG. 6 is an enlarged detail front view showing a latching rod arrangement for doors of the security cart.
Figure 7:
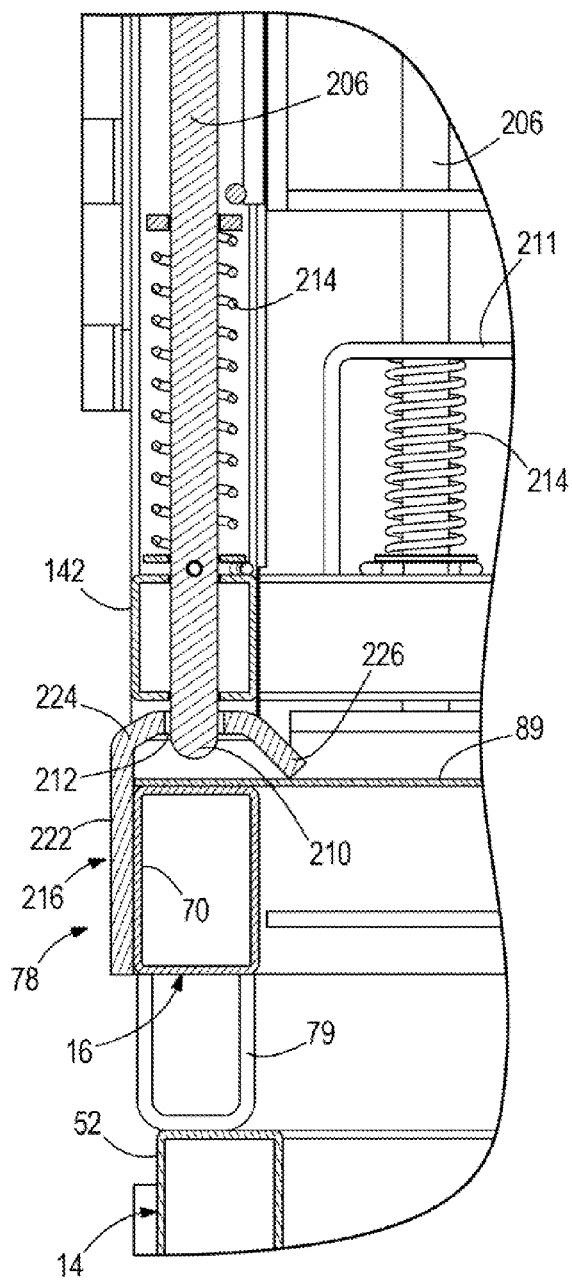
FIG. 7 is a partial sectional view of the latching rod arrangement taken on line 7-7 of FIG. 6 and showing the latching rod arrangement in an extended locking condition.
Figure 8:
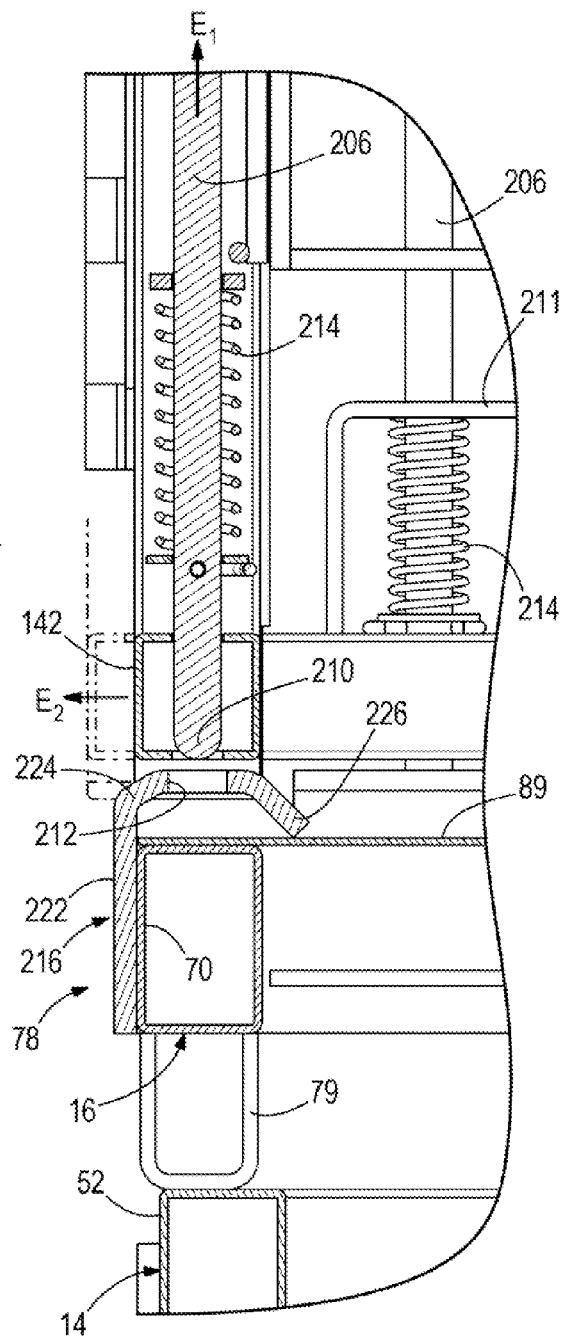
FIG. 8 is view similar to FIG. 7 showing the latching rod arrangement in a retracted unlocked condition.
Figures 18, 19:
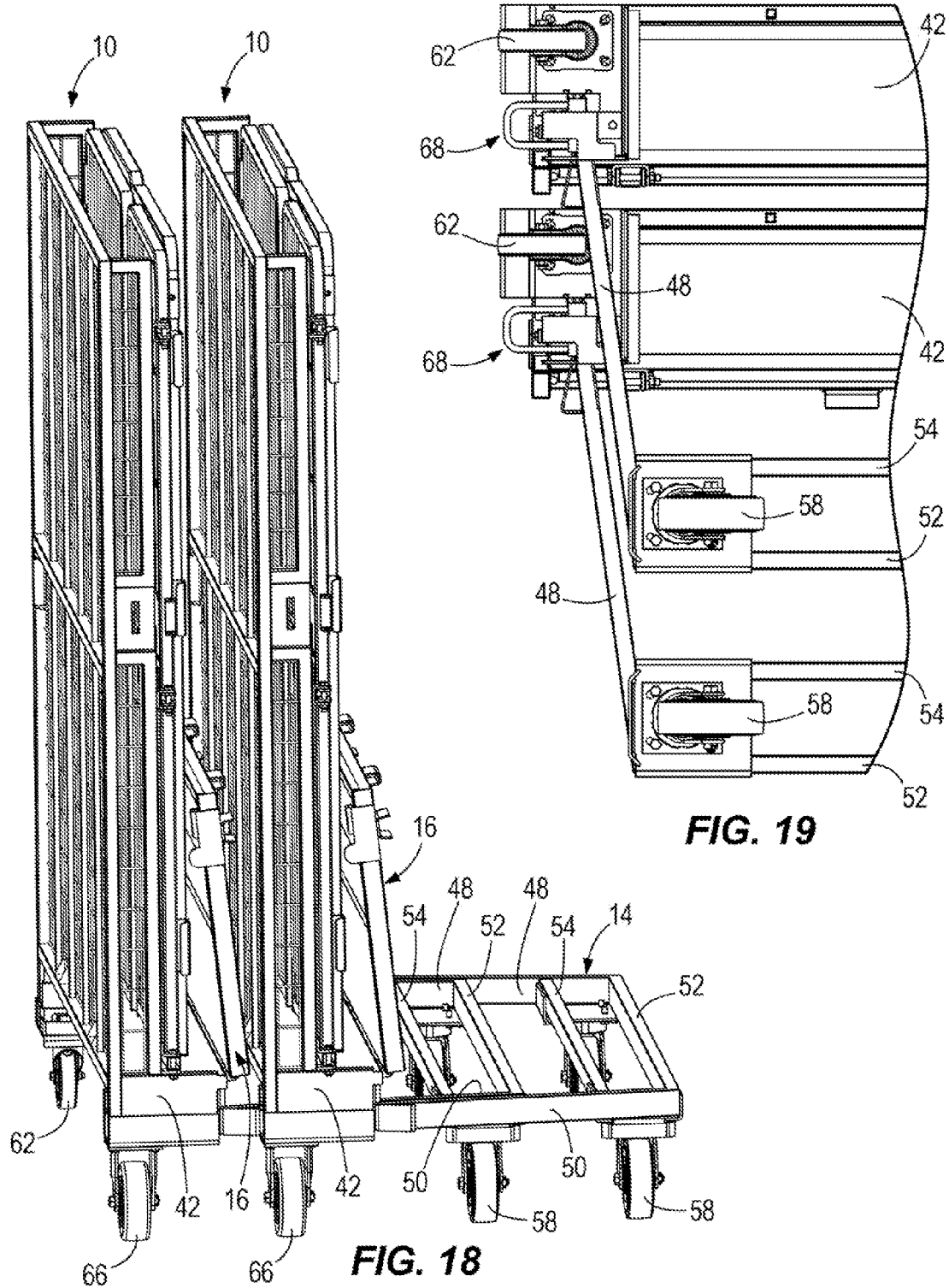
FIG. 18 is a perspective view of two collapsed security carts in a nested condition.
FIG. 19 is a partial bottom view of the nested security carts shown in FIG. 18.
Figure 20:
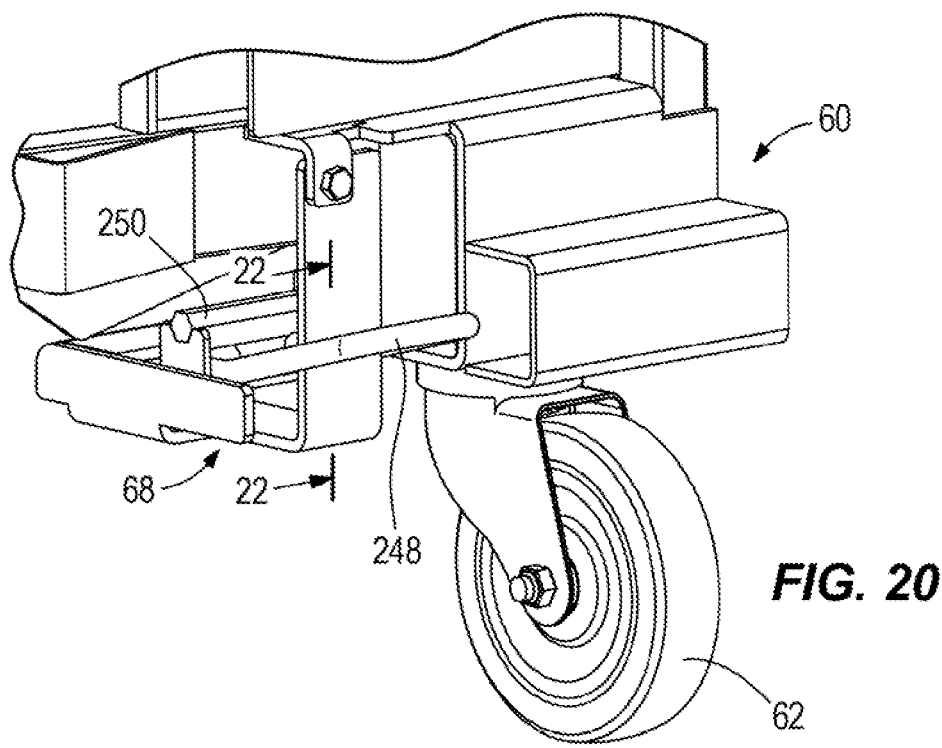
FIG. 20 is an enlarged detail perspective view of a braking mechanism for a caster wheel used on the security cart.
Figure 21:
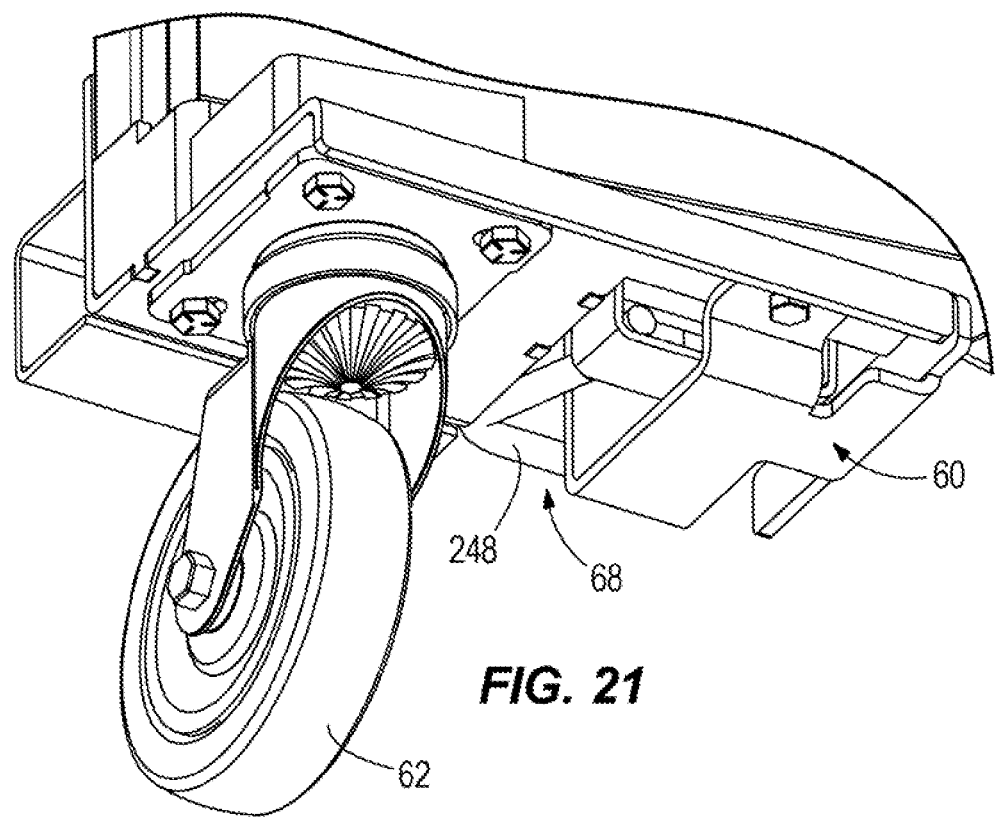
FIG. 21 is a bottom perspective view of FIG. 20.
Figure 22:
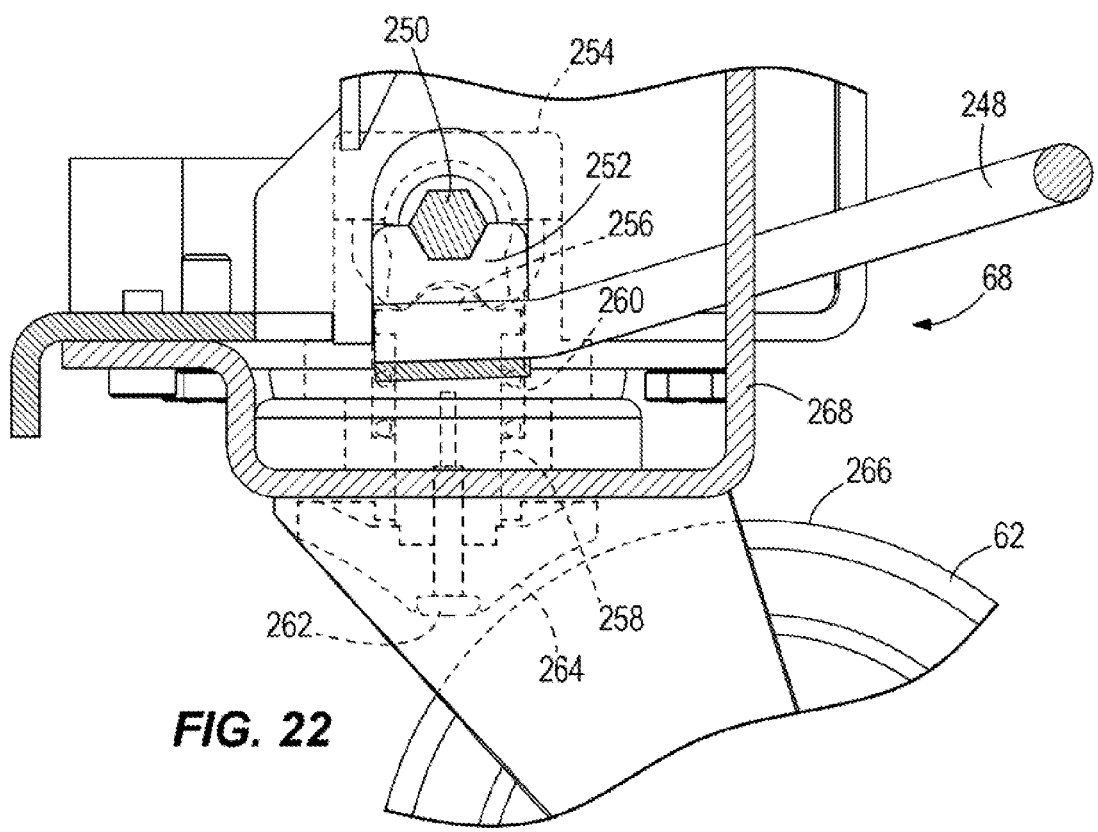
FIG. 22 is an enlarged sectional view of the braking mechanism taken on line 22-22 of FIG. 20 showing the braking mechanism in an unlocked mode.
Figure 23:
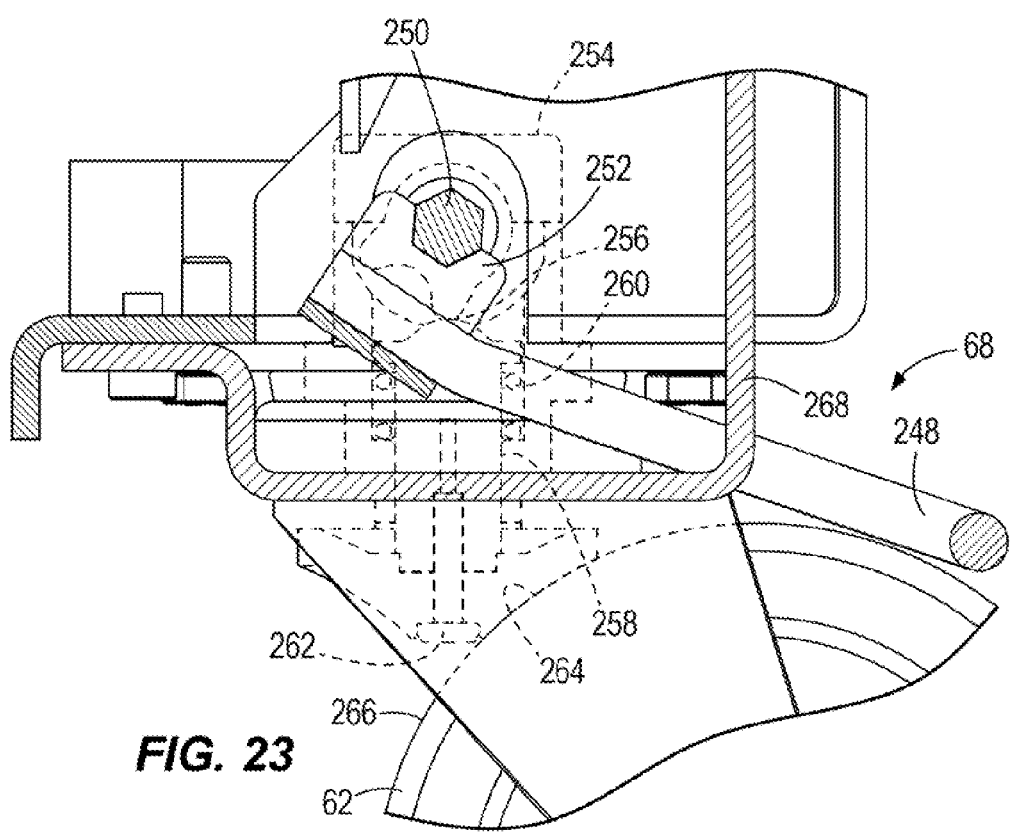
FIG. 23 is a view similar to FIG. 22 showing the braking mechanism in a locked mode.

FIGS. 6, 7 and 18 illustrate the spring-biased latching rod arrangements 150, 176 for controlling locking and unlocking of the doors 22, 24 relative to the base shelf 16. The latching rod arrangement 150 includes an elongated locking rod 206 having a U-shaped handle 208 and a rod end 210 (FIGS. 7 and 8). The rod 206 and the handle 208 are slidably mounted for up and down movement as indicated by arrows C and arrows D through holes formed through member 164 on door 22. The lower end of rod 206 also passes through aligned openings in a guide 211 and lower member 142. Rod end 210 is movable into an out of locking engagement with an aperture 212 formed on one side of the front retaining bracket 78 secured to the front edge 70 of base shelf 16. Rod 206 includes a spring 214 mounted thereon for normally biasing the rod 206 in a downward direction so that rod end 210 is inserted within the aperture 212 to retain the door 22 in a locked position (FIG. 7). When it is desired to unlock door 22, the handle 208 is lifted upwardly in the direction of arrow $E_1$ (FIG. 8) against the bias of spring 214 so that the rod end 210 is withdrawn from the aperture 212. With the rod end 210 withdrawn, the door 22 is unlocked and can be swung outwardly in the direction of arrow $E_2$ as illustrated by the phantom lines in FIG. 8.

As seen in FIG. 13, the front retaining bracket 78 at the center front edge 70 of base shelf 16 includes a pair of identical spaced apart door retaining members 216, 218 separated by a recess 220. As seen in FIGS. 7 and 8, each of the members 216, 218 has the aperture 212, a vertical portion 222 attached to base shelf front edge 70, an upwardly-angled ramp portion 224 and a downwardly-angled ramp portion 226 engaged against upper surface 89 of base shelf 16. When swung open, the door 22 can be grasped and quickly pushed closed, such as by slamming the door 22, so that, by overcoming the bias of spring 214, the rod end 210 rides up over the upwardly-angled ramp portion 224, and is thereafter biased into locking engagement with the aperture 212.

The latching rod arrangement 176 for door 24 is similar in structure and function to latching rod arrangement 150 described above. The handle 208 of latching rod arrangement 176 moves up and down in the direction of arrows F and G and the lower end of rod 206 of latching rod arrangement 176 passes through a hole in lower member 168 of door 24. When both doors 22, 24 are in their locked position as shown in FIG. 6, the lower ends of door inner members 144, 170 are retained in the recess 220 formed in the front retaining bracket 78. Retaining brackets 152 on inner member 154 of door 22 are engaged with the inner member 170 of door 24. It should be understood that even if handle 206 on door 24 is raised, door 24 cannot be swung outwardly if latching rod arrangement 150 on door 22 is in the locked position because of the retaining brackets 152. The handle 208 on door 22 is provided with a retainer 228 for receiving a locking pin (not shown) attached by a lanyard to the cart 10 when it is desired to keep the doors 22, 24 in their locked positions such as during transit of the cart 10. This provides a backup restraint system to keep the doors 22, 24 locked, if for some reason the rod ends 210 are not retained in apertures 212.

Figure 10:
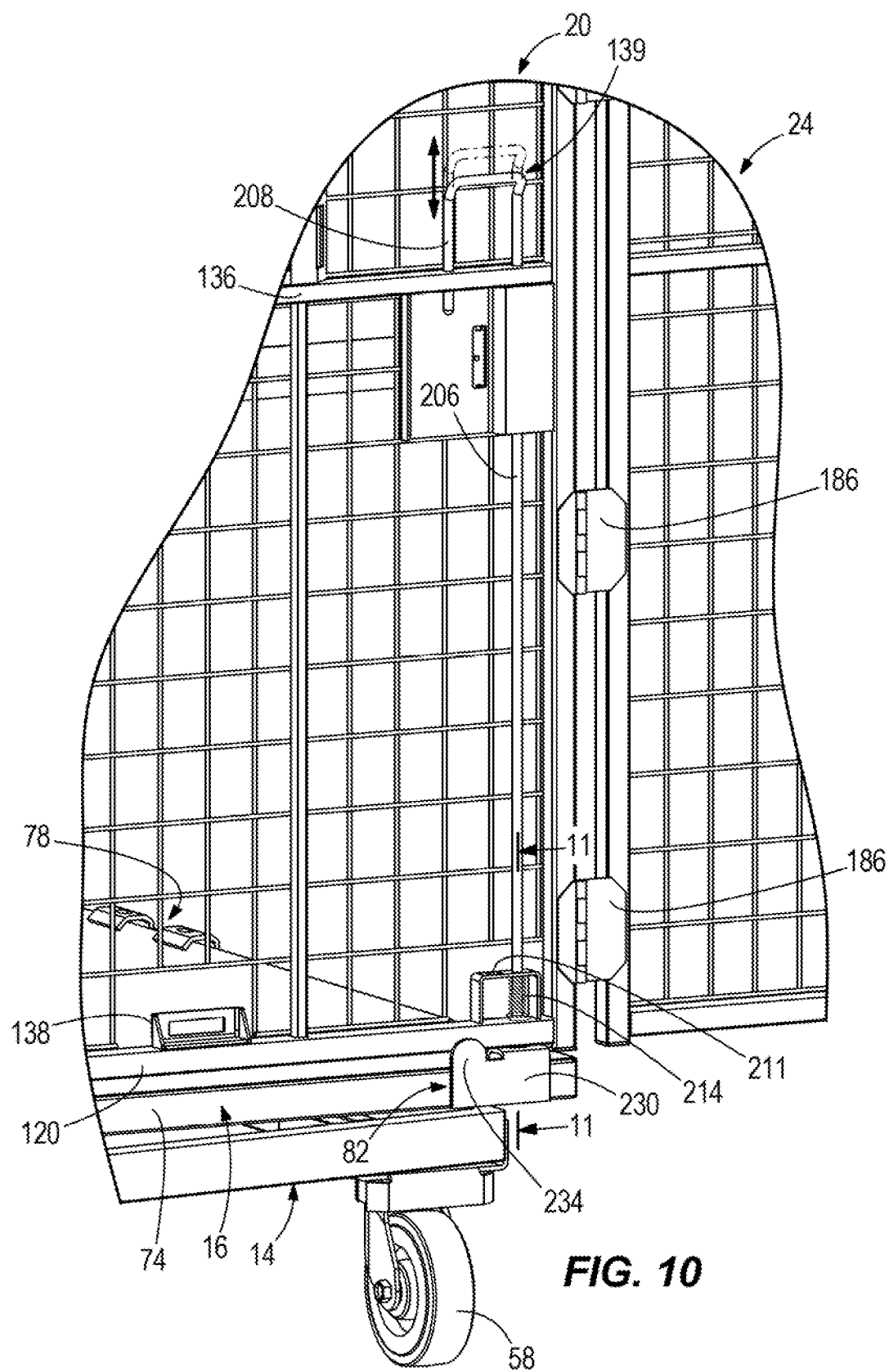
FIG. 10 is a fragmentary enlarged left side view of the security cart shown in FIG. 9 illustrating a latching rod arrangement for a left sidewall and a pivotal connection between the left sidewall and the left front door.
Figure 11:
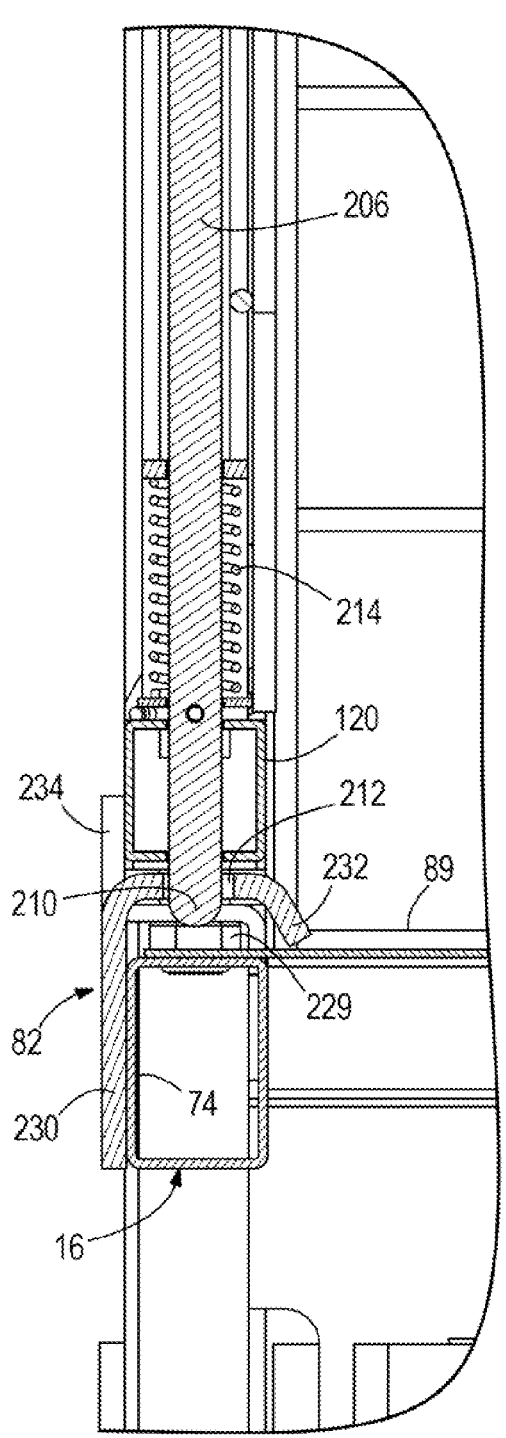
FIG. 11 is an enlarged sectional view of the latching rod arrangement of FIG. 10 shown in an extended locking condition.
Figure 12:
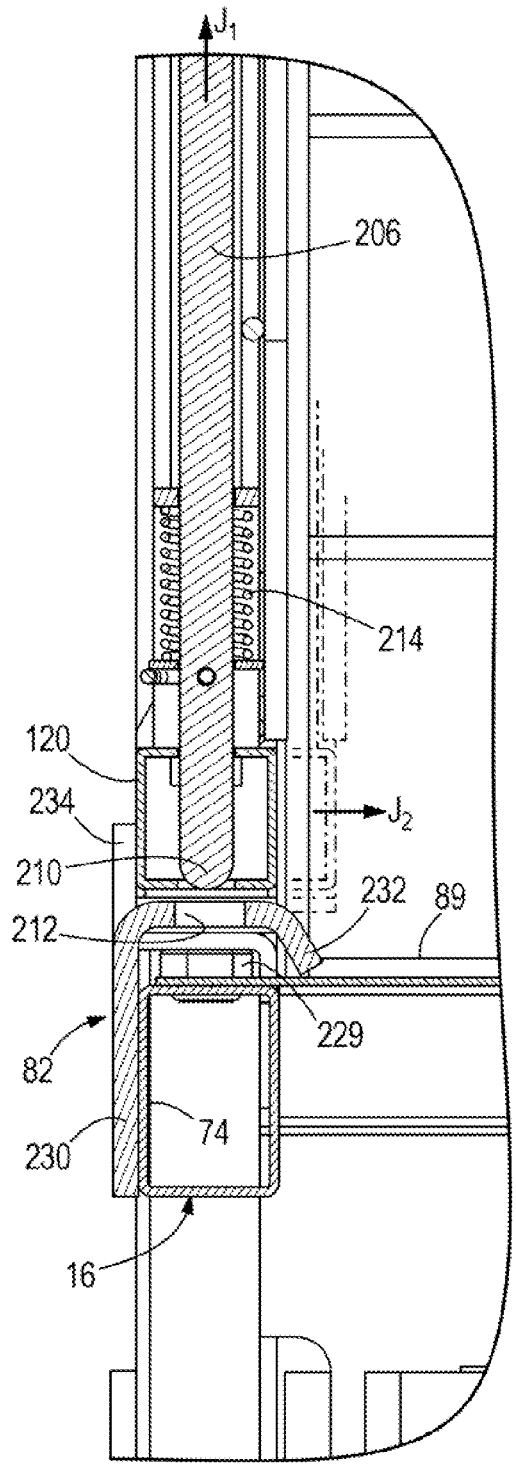
FIG. 12 is a view similar to FIG. 11 showing the latching rod arrangement in a retracted unlocked condition.

Turning now to FIGS. 10-12, the latching rod arrangement 139 on sidewall 20 cooperates with the side retaining bracket 82 on the base shelf 16 to control locking and unlocking of the sidewall 20 relative to the base shelf 16. The latching rod arrangement 139 is similar to latching rod arrangements 150, 176 on doors 22, 24, and includes the elongated locking rod 206 having the U-shaped handle 208 and the rod end 210. The rod 206 and the handle 208 are slidably mounted for up and down movement in the direction of arrows H and I through holes formed in member 136. The lower end of rod 206 passes through an opening in a guide 211 mounted on lower member 120. The rod end 206 is movable into and out of engagement with the aperture 212 formed on the side retaining bracket 82. The rod 206 includes a spring 214 for biasing the rod 206 downwardly so that the rod end 210 is inserted in the aperture 212 and engages an element 229 to shelf base 16 to retain the sidewall 20 in the locked position (FIG. 11). When it is desired to unlock the sidewall 20, the handle 208 is raised in the direction of arrow J (FIG. 12) to withdraw the rod end 210 from the aperture 212 enabling the sidewall 20 to be swung inwardly over the shelf base 16 in the direction of arrow $J_2$.

The side retaining bracket 82 includes a vertical portion 230 secured to side edge 74 of shelf base 16, and a downwardly-angled ramp portion 232 engaged with the upper surface 89 of the base shelf 16. The ramp portion 232 functions similar to ramp portion 224 in lifting and locating the sidewall 20 so that the rod end 210 is re-engaged in aperture 212 to place sidewall 20 in the locked position, such as when the sidewall 20 is swung back in a direction opposite arrow $J_2$. In addition, the side retaining bracket 82 includes an upstanding tab 234 which functions as a stop element to continuously prevent the sidewall 20 from being swung outwardly of the cart 10.

The latching arrangement 112 for sidewall 18 cooperates with the side retaining bracket 80 to control locking and unlocking of the sidewall 18. Similarities in structure and function are found in latching rod arrangement 112 for sidewall 18 and latching rod arrangement 139 for sidewall 20, as well as in side retaining bracket 82 and side retaining bracket 80.

Figure 17:
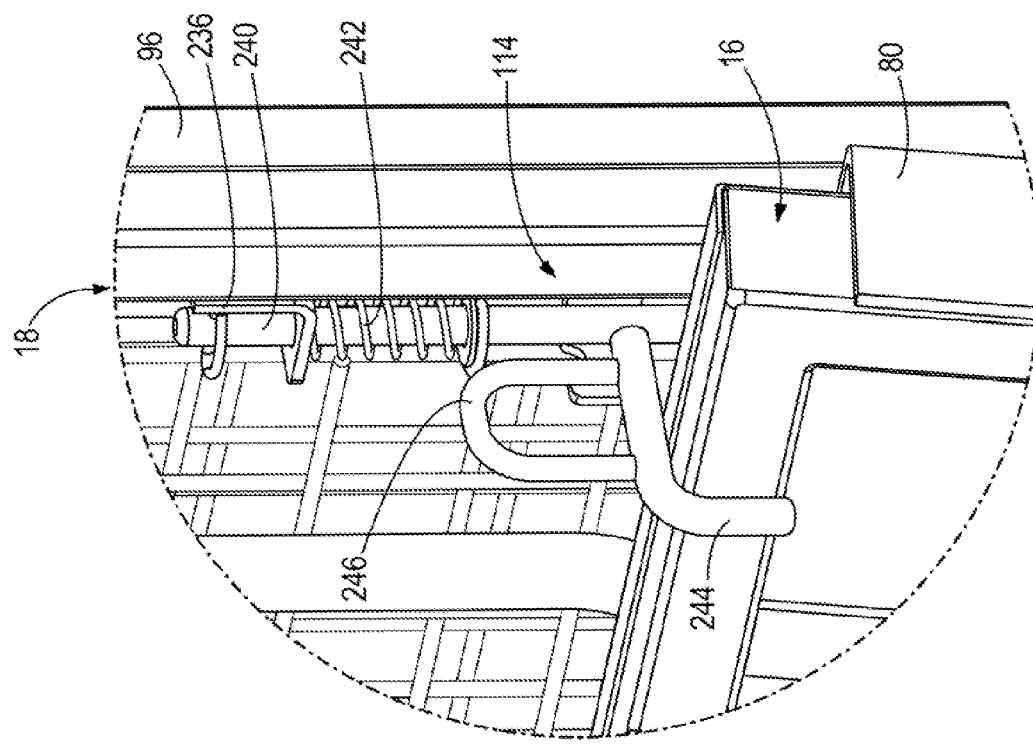
FIG. 17 is an enlarged detail view of the retaining arrangement for holding the base shelf in the upright raised position as taken on line 17-17 of FIG. 15.
Figure 16:
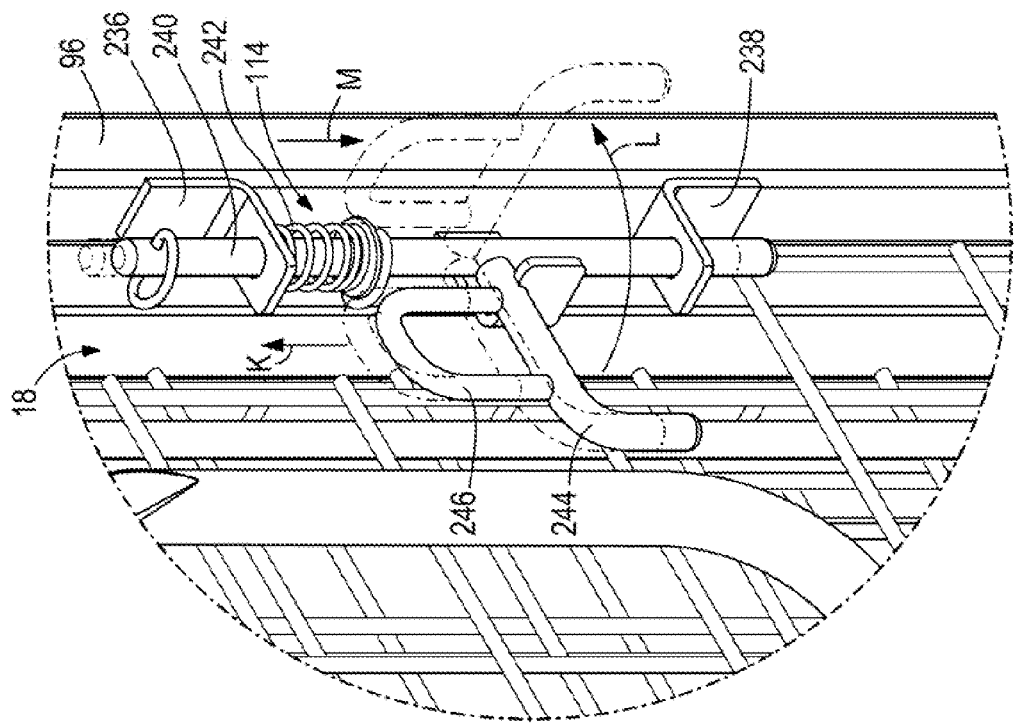
FIG. 16 is an enlarged detail view of a retaining arrangement for holding the base shelf in the upright raised position taken on line 16-16 of FIG. 14 showing the manner in which the retaining arrangement is operated.

FIGS. 16 and 17 illustrate the retaining latch arrangement 114 on sidewall 18 for holding the base shelf 16 in the raised position shown in FIG. 15. The latch arrangement 114 includes respective upper and lower spaced apart brackets 236, 238 fixed on the rear member 96 of sidewall 18. The latch arrangement 114 also includes a rod 240 which passes through aligned holes formed in the brackets 236, 238. The rod 240 includes a spring 242 and an L-shaped latching finger 244 provided with a U-shaped handle 246. The rod 240, the latching finger 244 and the handle 246 are normally biased downwardly by the spring 242 as shown in FIG. 17, such as when the sidewall 18 is in a locked position or being swung therefrom. The latch arrangement 114 is configured such that the rod 240, the latch finger 244 and the handle 246 are first slidable up as represented by arrow K against the bias of spring 242, then rotatable as represented by arrow L and last released downwardly aided by the release force of spring 242 as represented by arrow M. FIG. 17 illustrates the latching finger 244 engaged with a bottom surface of and retaining the base shelf 16 when the base shelf 16 is moved to the raised position as will be further described below.

FIGS. 20-23 illustrate the braking mechanism 68 incorporated in the mounting structure 60 for the rear wheel swivel caster 62. The braking mechanism 68 is a commercially available product identified as Model 761168 and produced by Blickle Rader and Rollen GMBH, Rosenfeld, Germany. The brake mechanism 68 includes a brake pedal 248 attached to a hex rod 250 which is drivingly inserted in a cam element 252 of a cam mechanism 254. The cam element 252 is engaged with a head 256 of a plunger 258 surrounded by a spring 260. A bottom end of the plunger 258 is joined by a fastener 262 to a brake shoe 264 which is engagable and disengagable with a rolling outer surface 266 of caster 62. In an unlocked position shown in FIG. 22, the brake pedal 248 is upwardly-angled and the spring 260 acts to bias the plunger head 256 so that the braking shoe 264 is disengaged from the surface 266 of caster 62. In this unlocked position, the cart 10 is free to travel. In a locked position shown in FIG. 23, the brake pedal 248, when pushed downwardly by foot pressure, rotates the hex rod 250 clockwise causing the cam element 252 to push the plunger 258 downwardly resulting in frictional braking contact of the brake shoe 264 with the surface 266 of caster 62 so that travel of cart 10 is prevented. Suitable guarding structure 268 is provided to protect the brake mechanism 68. The braking mechanism 68 locks the swivel caster 62 in any desired position and is designed to fit within a desired footprint of the cart 10.

The cart 10 is provided with e-track straps which can be used to secure large loads (e.g. an engine or transmission) within the cart 10 and prevent such loads from sliding therein. In addition, the cart 10 is provided externally with e-track straps used in securing the cart 10 during transit to a support surface, such as the inside wall of a truck. As is well-known, typical e-track straps feature a cinched strap connected to a buckle with a spring-biased clip which is removably engaged with a slotted connector that has been bolted to a support structure.

According to the present disclosure, the slotted connector is formed as a mounting bracket 270 (FIG. 25) fixed such as by welding to a vertical support member 272 on the cart 10, and formed with a receiving slot 274 for engaging a buckle end 276 of an e-track strap 278. Such mounting bracket structure is exemplified by the mounting brackets 37 (FIG. 2) on the bottom of rear wall 12, and the mounting brackets 116, 138 (FIGS. 1 and 2) on the bottom of sidewalls 18, 20, respectively. A mounting bracket 280 (FIG. 9) is provided on the extension of sidewall 18, and a mounting bracket 282 (FIG. 2) is provided on the extension of sidewall 20. The mounting brackets 37, 116, 138, 280, 282 provide for an easy connection of a buckle end of an e-track strap at various locations on the cart.

Figure 24:
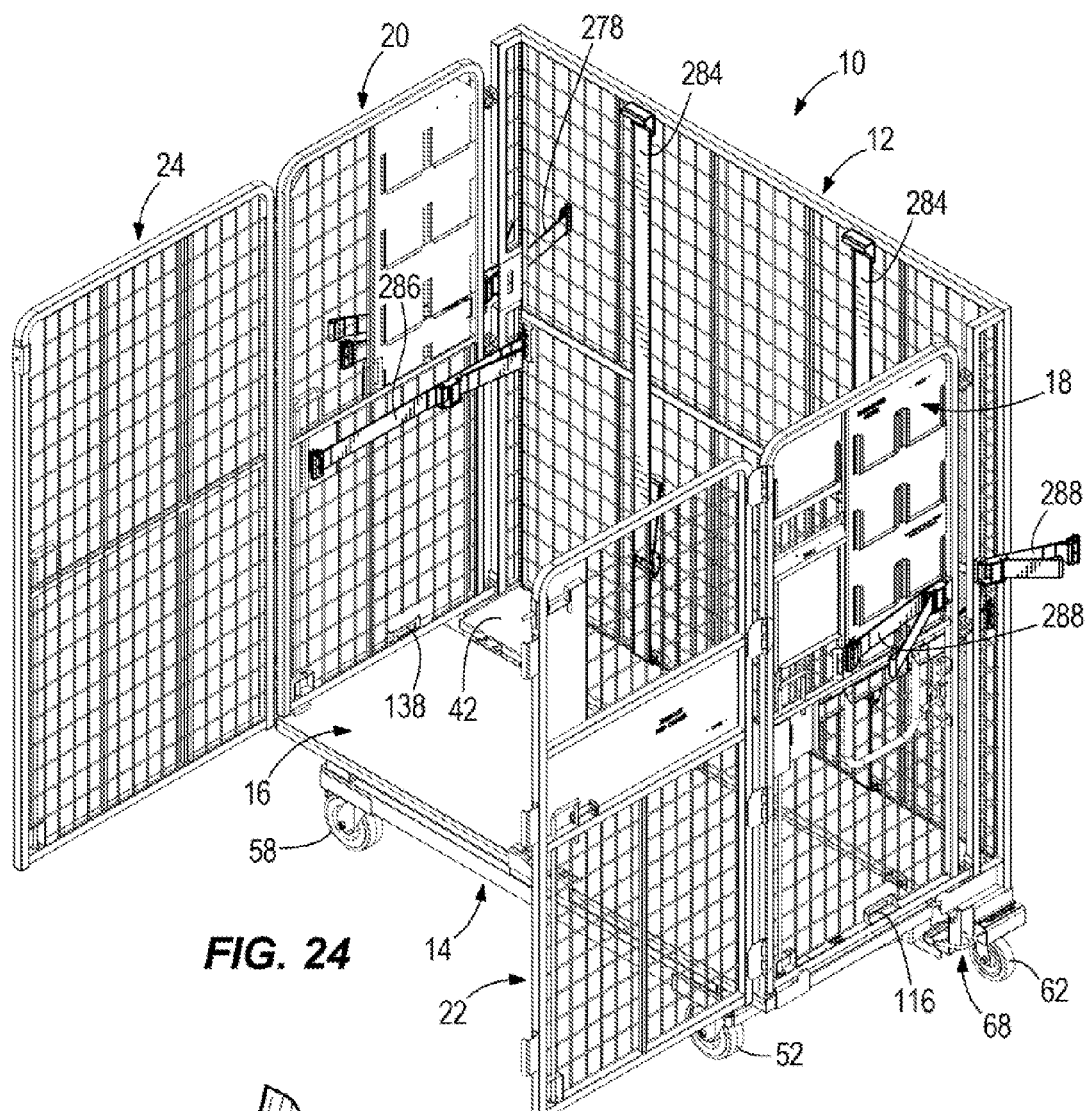
FIG. 24 is a perspective view similar to FIG. 9 showing the security cart equipped with a further e-track strapping arrangement.
Figure 25:
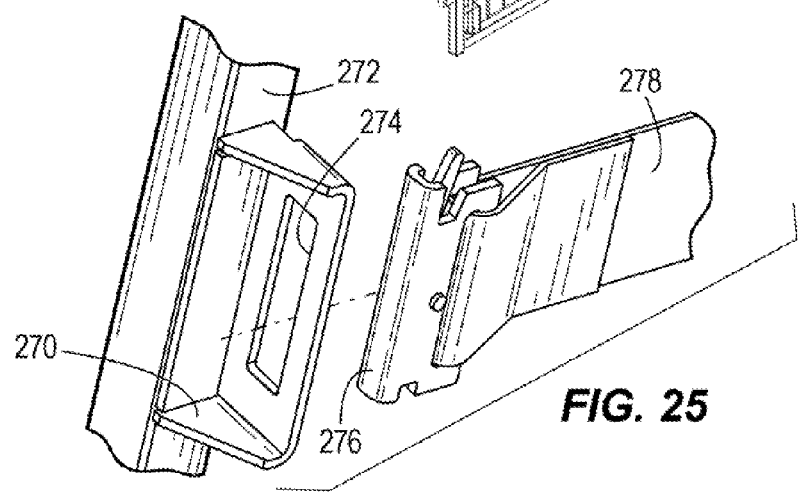
FIG. 25 is an exploded view of a mounting bracket used on the security cart for receiving and securing an e-track strap.

FIG. 24 illustrates a pair of space e-track straps 284 extending vertically along the inside of rear wall 12. The straps 284 have upper ends hooked to the top of rear wall 12 and lower buckle ends coupled to the brackets 37 (FIG. 2). Alternatively, strap 284 could extend vertically along inside surfaces of sidewalls 18, 20 using respective mounting brackets 116, 138 as bottom connectors. Another e-track strap 286 extends horizontally along the inside of sidewall 20 and is used to secure an item against the sidewall 20. Further e-track straps 288 are provided on the exterior sidewalls 18, 20 such as for securing the cart 10 within a truck.

It should be appreciated that with the cart 10 in the transport condition shown in FIG. 1, the sidewalls 18, 20 and the doors 22, 24 are supported over the peripheral edges of the base shelf 16. In addition, the sidewalls 18, 20 which are coupled to the doors 22, 24 are supported at the front lower ends upon the base shelf 16, such as exemplified in FIG. 11 which helps prevent sagging of the sidewalls 18, 20 and the doors 22, 24. Further structural support for the doors 22, 24 is provided by the upper door latch pin arrangement 148, and bracket arrangement 196, 198 between the upper ends of the doors 22, 24 prevents misalignment thereof.

Figure 26:
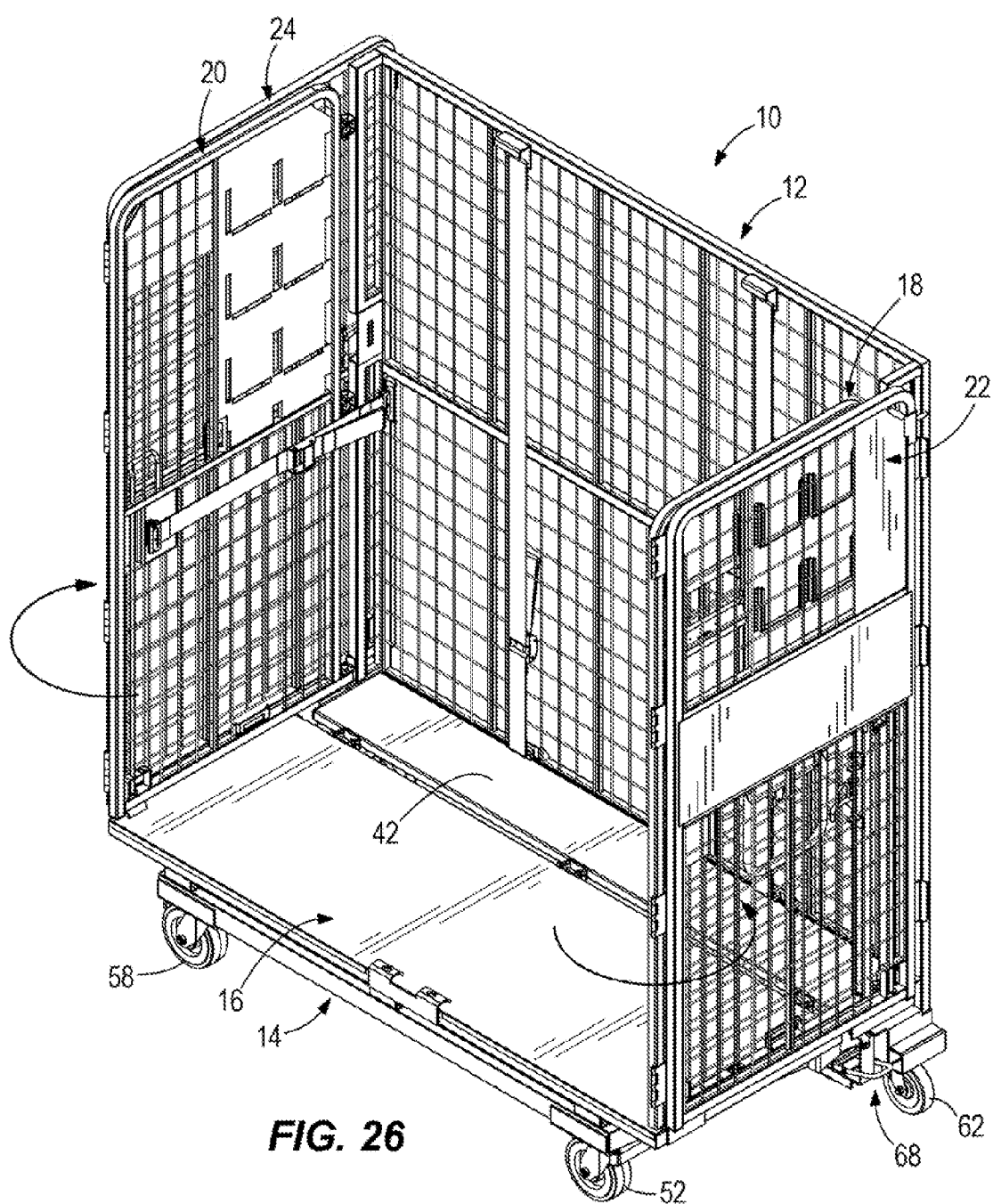
FIG. 26 is a perspective view of the security cart showing the doors folded outwardly upon the sidewalls.

In use, release of the upper door latching pin arrangement 148 and the door latching rod arrangements 150, 176 permit the doors 22, 24 to be swung outwardly in the directions of arrows N and O as shown in FIG. 9 so that items may be loaded into the cart 10. If desired, during a loading operation, the doors 22, 24 can be further folded outwardly against the outside of the sidewalls 18, 20 as depicted in FIG. 26. Once loading is finished, the doors 22, 24 are again placed in locked position using the latching rod arrangements 150, 176 and the latching pin arrangement 148.

If it is desired to fold the cart 10 to a collapsed condition once the doors 22, 24 have been opened as shown in FIG. 9, first the latching rod arrangement 139 on sidewall 20 is released. As seen in FIG. 13, this enables the sidewall 20 and the door 24 to be swung inwardly upon the support member 42 in the direction of arrow P towards the rear wall 12 such that the sidewall 20 and the door 24 are supported above the supporting member 42 at the bottom of rear wall 24 and forwardly in parallel relationship therewith. Next, as shown in FIG. 14, the latching rod arrangement 112 on sidewall 18 is released so that the sidewall 18 and the door 22 are pivoted together upon support member 42 in the direction of arrow Q towards the rear wall 12 and positioned against the sidewall 20 and the door 24 and over the supporting member 42. Then, as seen in FIG. 15, the base shelf 16 is pivoted upwardly relative to a front edge of the supporting member 42 so that the base shelf 16 is placed in the raised position. Lastly, the retaining latch arrangement 114 on the folded sidewall 18 is manipulated as previously described and shown in FIG. 16 to engage the raised front edge of the base shelf 16, and maintain the base shelf 16 in the raised position so that the sidewalls 18, 20 and the doors 22, 24 cannot move. At this point the cart 10 is in the fully collapsed position.

If there are multiple carts 10 in the folded collapsed position, the carts 10 due the configuration of the base frame 14 may be conveniently nested as depicted in FIGS. 18 and 19.

In the present disclosure, certain terms have been used for brevity, clearness and understanding. No unnecessary limitations are to be implied therefrom beyond the requirement of the prior art because such terms are used for descriptive purposes only and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A security cart movable among transport, loading and collapsed conditions comprising:

a rear wall having a pair of side extensions projecting forwardly therefrom and a bottom supporting member extending forwardly from the rear wall in support of the side extensions;

a base frame having a pair of diverging limbs interconnected together at front ends thereof by a front cross piece, the limbs having front ends provided with a set of front wheels and rear ends provided with a set of rear wheels supported beneath the bottom supporting member of the rear wall;

a base shelf supported in a horizontal load-bearing position upon the base frame and pivotally mounted about a rear edge of the base shelf to the bottom supporting member of the rear wall for movement to a raised position;

a first sidewall pivotally connected to one of the side extensions of the rear wall and to the bottom supporting member, the first sidewall being pivoted between a first position locked and supported on one side edge of the base shelf, and a second position folded parallel to the rear wall;

a first door pivotally attached to the first sidewall, the first door being pivoted between a first position locked to the base shelf, and a second position unlocked from the base shelf and folded with the first sidewall parallel to the rear wall;

a second sidewall pivotally connected to the other of the side extensions of the rear wall and to the bottom supporting member, the second sidewall being pivoted between a first position locked and supported on another side edge of the base shelf, and a second position folded parallel to the rear wall and forwardly of the first door in its second position;

a second door pivotally attached to the second sidewall, the second door being pivoted between a first position locked to the base shelf, and a second position unlocked from the base shelf and folded with the second sidewall parallel to the rear wall and forwardly of the first sidewall in its second position; and the base shelf being pivoted from the horizontal position to the raised position for retaining the first sidewall, the first door, the second sidewall and the second door in their second positions when the cart is in the collapsed, wherein the base shelf lies forwardly of, and the bottom supporting member lies beneath and supports: the first sidewall, the first door, the second sidewall and the second door in their second positions.

2. The security cart of claim 1, wherein the rear wall is provided with at least one mounting bracket for enabling securement of an e-track strap on the rear wall.

3. The security cart of claim 1, wherein at least one of the wheels includes a braking mechanism for permitting and preventing rolling travel of the cart.

4. The security cart of claim 3, wherein the braking mechanism includes a brake pedal attached to a hex rod received in a cam element of a cam mechanism.

5. The security cart of claim 4, wherein the cam element is engagable with a spring-biased plunger joined to a brake shoe which is engagable and disengagable with a rolling surface of the one of the wheels.

6. The security cart of claim 1, wherein a front edge of the base shelf includes a front retaining bracket for retaining the first and second doors in the locked position.

7. The security cart of claim 1, wherein the side edges of the base shelf include side retaining brackets for holding the first and second sidewalls in the locked position supported upon the base shelf.

8. The security cart of claim 7, wherein each of the side retaining brackets include a locking aperture, a ramp portion leading to the locking aperture and a stop tab.

9. The security cart of claim 7, wherein the first sidewall includes a first latching rod arrangement engagable and disengagable with one of the side retaining brackets.

10. The security cart of claim 9, wherein the second sidewall includes a second latching rod arrangement engagable and disengagable with the other of the side retaining brackets.

11. The security cart of claim 10, wherein the first door includes a third latching rod arrangement engagable and disengagable with the front retaining bracket.

12. The security cart of claim 11, wherein the second door includes a fourth latching rod arrangement engagable and disengagable with the front retaining bracket.

13. The security cart of claim 1, wherein the second sidewall includes a retaining latch arrangement for holding the base shelf in the raised position.

14. The security cart of claim 1, wherein the second door includes an upper door latching pin arrangement for holding upper ends of the first door and the second door together in their first positions locked to the base shelf.

15. The security cart of claim 14, wherein the first door includes a receiving portion engagable and disengagable with the upper door latching pin arrangement on the second door.

16. The security cart of claim 15, wherein the receiving portion includes a U-shaped bracket engagable with an angled bracket of the upper door latching pin arrangement for preventing misalignment of the first and second doors at upper ends thereof.

17. The security cart of claim 1, wherein e-track straps are provided internally and externally of the rear wall and the first and second sidewalls.

18. The security cart of claim 1, wherein multiple carts in the collapsed position are configured to be nested relative to one another.

19. The security cart of claim 1, wherein the first door is pivotable to a third position folded upon an outer surface of the first sidewall.

20. The security cart of claim 1, wherein the second door is pivotable to a third position folded upon an outer surface of the second sidewall.

21. A security cart movable among transport, loading and collapsed conditions comprising:

a rear wall having a pair of side extensions projecting forwardly therefrom and a bottom supporting member extending forwardly from the rear wall in support of the side extensions;

a base frame having a pair of diverging limbs interconnected together at front ends thereof by a front crosspiece, the limbs having front ends provided with a set of front wheels, and rear ends provided with a set of rear wheels supported beneath the bottom supporting member of the rear wall;

a base shelf supported in a horizontal load-bearing position upon the base frame and pivotally mounted about a rear edge of the base shelf to the bottom supporting member of the rear wall for movement to a raised position;

a first sidewall pivotally connected to one of the side extensions of the rear wall and to the bottom supporting member, the first sidewall being pivoted between a first position locked and supported on one edge of the base shelf and a second position folded parallel to the rear wall;

a first door pivotally attached to the first sidewall, the first door being pivoted between a first position locked to the base shelf, and a second position unlocked from the base shelf and folded with the first sidewall parallel to the rear wall;

a second sidewall pivotally connected to the other of the side extensions of the rear wall and to the bottom supporting member, the second sidewall being pivoted between a first position locked and supported on another side edge of the base shelf, and a second position folded parallel to the rear wall and forwardly of the first door in its second position;

a second door pivotally attached to the second sidewall, the second door being pivoted between a first position locked to the base shelf, and a second position unlocked from the base shelf and folded with the second sidewall parallel to the rear wall and forwardly of the first sidewall in its second position; and the base shelf being pivoted from the horizontal position to the raised position for retaining the first sidewall, the first door, the second sidewall, and the second door in their second positions when the cart is in the collapsed condition, wherein the second sidewall is provided with a retaining latch arrangement for holding the base shelf in the raised, and wherein the base shelf lies forwardly of, and the bottom supporting member lies beneath and supports: the first sidewall, the first door, the second sidewall and the second door in their second positions.

22. The security cart of claim 21, wherein, with the base shelf in the raised position, the retaining latch arrangement is movable about a vertical axis from a first position lying against the second sidewall to a second position swung away from the second sidewall and a third position engaged with the base shelf.

23. The security cart of claim 22, wherein the retaining latch arrangement includes a spring biased to hold the retaining latch arrangement in the first and third positions.

24. The security cart of claim 21, wherein latching rod arrangements are provided on the first sidewall, the first door, the second sidewall, and the second door, and are engagable and disengagable with retaining brackets on the base shelf.

25. A security cart movable among transport, loading and collapsed conditions comprising:
a rear wall having a pair of side extensions projecting forwardly therefrom and a bottom supporting member extending forwardly from the rear wall in support of the side extensions;
a base frame having a pair of diverging limbs interconnected together at front ends thereof by a front crosspiece, the limbs having front ends provided with a set of front wheels and rear ends provided with a set of rear wheels supported beneath the bottom supporting member of the rear wall;
a base shelf supported in a horizontal load-bearing position upon the base frame and pivotally mounted about a rear edge of the base shelf to the bottom supporting member of the rear wall for movement to a raised position;
a first sidewall pivotally connected to one of the side extensions of the rear wall and to the bottom supporting member, the first sidewall being pivoted between a first position locked and supported on one side edge of the base shelf and a second position folded parallel to the rear wall, the first sidewall being provided with a first latching rod arrangement having a first latching rod;
a first door pivotally attached to the first sidewall, the first door being pivoted between a first position locked to the base shelf, and a second position unlocked from the base shelf and folded with the first sidewall parallel to the rear wall;

a second sidewall pivotally connected to the other of the side extensions of the rear wall and to the bottom supporting member, the second sidewall being pivoted between a first position locked and supported on another side edge of the base shelf, and a second position folded parallel to the rear wall and forwardly of the first door in its second position, the second sidewall being provided with a second latching rod arrangement provided with a second latching rod;

a second door pivotally attached to the second sidewall, the second door being pivoted between a first position locked to the base shelf, and a second position unlocked from the base shelf and folded with the second sidewall parallel to the rear wall and forwardly of the first sidewall in its second position; and the base shelf being pivoted from the horizontal position to the raised position for retaining the first sidewall, the first door, the second sidewall and the second door in their second positions when the cart is in the collapsed condition, wherein the base shelf has opposed side edges, each being provided with a side retaining bracket configured with a locking aperture, a ramped portion leading to the locking aperture and a stop tab, and wherein each latching rod is engagable and disengagable with the ramped portion and the locking aperture, and each stop tab prevents each of the first and second sidewalls from swinging outwardly away from the base shelf.

26. A security cart movable among transport, loading and collapsed conditions comprising:
a rear wall having a pair of side extensions projecting forwardly therefrom and a bottom supporting member extending forwardly from the rear wall in support of the side extensions;
a base frame provided with a set of wheels;
a base shelf supported in a horizontal load-bearing position upon the base frame and pivotally mounted about a rear edge of the base shelf to the bottom supporting member of the rear wall for movement to a raised position;
a first sidewall pivotally connected to one of the side extensions of the rear wall, the first sidewall being pivoted between a first position locked and supported on one side edge of the base shelf, and a second position folded parallel to the rear wall;
a first door pivotally attached to the first sidewall, the first door being pivoted between a first position locked to the base shelf, and a second position folded with the first sidewall parallel to the rear wall;
a second sidewall pivotally connected to the other of the side extensions of the rear wall and to the bottom supporting member, the second sidewall being pivoted between a first position locked and supported on another side edge of the base shelf, and a second position folded parallel to the rear wall and forwardly of the first door in its second position;
a second door pivotally attached to the second sidewall, the second door being pivoted between a first position locked to the base shelf, and a second position folded with the second sidewall parallel to the rear wall and forwardly of the first sidewall in its second position; and the base shelf being pivoted from the horizontal position to the raised position for retaining the first sidewall, the first door, the second sidewall and the second door in their second positions when the cart is in the collapsed, wherein the base shelf lies forwardly of, and the bottom supporting member lies beneath and supports: the first sidewall, the first door, the second sidewall and the second door in their second positions.

\* \* \* \* \*